(12) United States Patent
Lyubarsky et al.

(10) Patent No.: US 12,526,389 B2
(45) Date of Patent: Jan. 13, 2026

(54) HIGH DYNAMIC RANGE (HDR) USING A PHASE LIGHT MODULATOR (PLM) AND LASER PHOSPHOR ILLUMINATION

(71) Applicant: TEXAS INSTRUMENTS INCORPORATED, Dallas, TX (US)

(72) Inventors: Alexander Lyubarsky, Dallas, TX (US); Kristofer Scott Oberascher, Van Alstyne, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 457 days.

(21) Appl. No.: 17/954,518

(22) Filed: Sep. 28, 2022

(65) Prior Publication Data

US 2023/0128980 A1    Apr. 27, 2023

Related U.S. Application Data

(60) Provisional application No. 63/272,550, filed on Oct. 27, 2021.

(51) Int. Cl.
*H04N 9/31* (2006.01)
*G02B 26/00* (2006.01)
*G03B 21/20* (2006.01)

(52) U.S. Cl.
CPC ......... *H04N 9/3126* (2013.01); *G02B 26/008* (2013.01); *G03B 21/204* (2013.01); *G03B 21/2066* (2013.01); *G03B 21/208* (2013.01); *H04N 9/3158* (2013.01); *H04N 9/3161* (2013.01); *H04N 9/3167* (2013.01); *H04N 9/317* (2013.01)

(58) Field of Classification Search
CPC .. H04N 9/3126; H04N 9/3158; H04N 9/3161; H04N 9/3167; H04N 9/317; H04N 9/3114; G02B 26/008; G02B 19/0057; G02B 27/141; G03B 21/204; G03B 21/2066; G03B 21/208; G03B 33/08
USPC .......................................................... 353/31
See application file for complete search history.

(56) References Cited

U.S. PATENT DOCUMENTS

| | | | |
|---|---|---|---|
| 11,880,124 B2 | 1/2024 | Bartlett et al. | |
| 2018/0239230 A1* | 8/2018 | Pettitt | H04N 9/3105 |
| 2020/0372844 A1* | 11/2020 | Kobayashi | F21V 14/04 |
| 2021/0232093 A1* | 7/2021 | Madabhushi Balaji | H04N 9/3135 |

* cited by examiner

*Primary Examiner* — Magda Cruz
(74) *Attorney, Agent, or Firm* — Michael T. Gabrik; Frank D. Cimino

(57) ABSTRACT

An apparatus for high dynamic range (HDR) modulation includes one or more lasers configured to transmit respective beams of laser light with a single color mode and a PLM optically coupled to the one or more lasers. The PLM is configured to modulate the laser light to produce a first modulated light. The apparatus also includes a phosphor optically coupled to the PLM and configured to receive at least a first portion of the first modulated light from the PLM and to emit a phosphor light with multiple color modes. At least one spatial light modulator (SLM) is also optically coupled to the phosphor and configured to modulate the multiple color modes in the phosphor light and the single color mode to project a second modulated light.

20 Claims, 9 Drawing Sheets

HIGH DYNAMIC RANGE (HDR) USING A PHASE LIGHT MODULATOR (PLM) AND LASER PHOSPHOR ILLUMINATION

CROSS-REFERENCE TO RELATED APPLICATIONS

The present application claims priority to U.S. Provisional Patent Application No. 63/272,550, which was filed Oct. 27, 2021, titled "High Dynamic Range (HDR) Using A Phase Light Modulator (PLM) And Laser Phosphor Illumination," and is hereby incorporated herein by reference in its entirety.

BACKGROUND

Projection-based displays project images onto projection surfaces, such as onto a wall or a screen, to display video or pictures for viewing. Such displays can include cathode-ray tube (CRT) displays, liquid crystal displays (LCDs), and digital mirror device (DMD) displays, etc.

SUMMARY

In accordance with at least one example of the disclosure, an apparatus includes one or more lasers configured to transmit respective beams of laser light with a single color mode and a PLM optically coupled to the one or more lasers. The PLM is configured to modulate the laser light to produce a first modulated light. The apparatus also includes a phosphor optically coupled to the PLM and configured to receive at least a first portion of the first modulated light from the PLM and to emit a phosphor light with multiple color modes. At least one spatial light modulator (SLM) is also optically coupled to the phosphor and configured to modulate the multiple color modes in the phosphor light and the single color mode to project a second modulated light. The apparatus also includes a first surface optically coupled to the PLM and the at least one SLM. The first surface is a reflective surface configured to reflect a second portion of the first modulated light from the PLM to the at least one SLM or a transmissive surface configured to transmit the second portion of the first modulated light from the PLM to the at least one SLM.

In accordance with another example of the description, a device includes a processor configured to process an image to produce a processed image for display; one or more blue lasers configured to transmit a blue light; a PLM optically coupled to the one or more blue lasers and configured to modulate the blue light to produce a modulated blue light with a blue color mode; a phosphor optically coupled to the PLM and configured to receive at least a first portion of the modulated blue light from the PLM to emit a phosphor light with multiple color modes; at least one SLM optically coupled to the phosphor and configured to modulate the multiple color modes in the phosphor light and the blue color mode, and one or more controllers coupled to the processor, the one or more blue lasers, the PLM, and the at least one SLM, and configured to control the one or more blue lasers, the PLM, and the at least one SLM according to the processed image.

In accordance with another example of the description, a method includes emitting, by one or more blue lasers, incident light including a blue color mode to a PLM; modulating, by the PLM, the incident light to provide a blue color mode light; using at least a portion of the blue color mode light from the PLM to excite a phosphor and provide phosphor light including color modes other than the blue color mode; projecting, by illumination optics, an illumination light beam including the blue color mode light with the phosphor light including the color modes other than the blue color mode to a SLM; and modulating, by the SLM according to an image, the illumination light beam to provide a modulated light for displaying the image including the color modes from the one or more blue lasers and the phosphor light.

DETAILED DESCRIPTION

Figure 1:
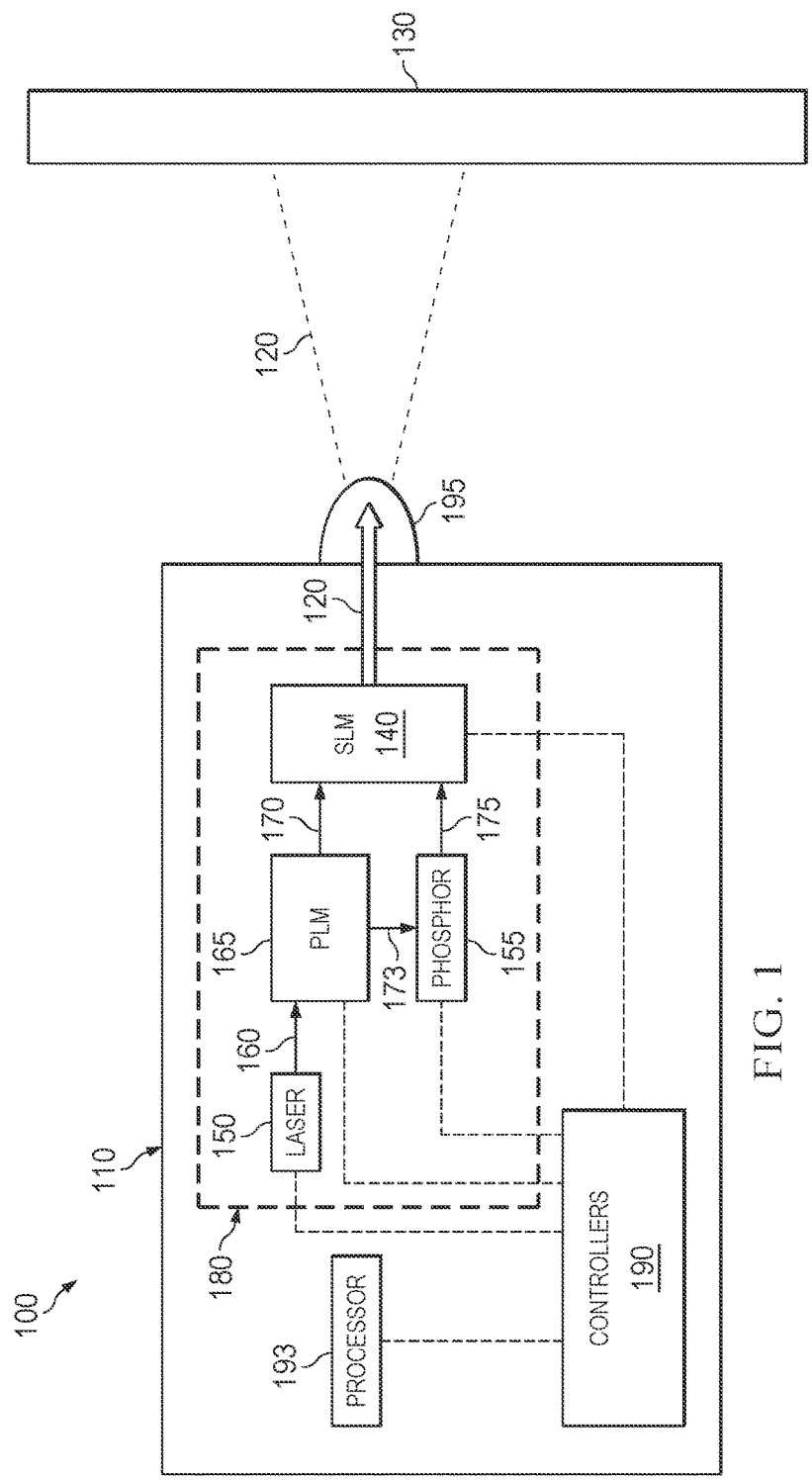
FIG. 1 is a diagram of a display system, in accordance with various examples.

Projection-based displays can include SLMs, which display projected images by changing the intensity of projected light across the displayed image pixels. For example, SLM displays include micro-electromechanical system (MEMS) based SLMs, such as digital mirror devices (DMDs). SLM displays also include liquid crystal-based SLMs, such as LCDs, liquid crystal on silicon (LCoS) devices, and ferroelectric liquid crystal on silicon (FLCoS) devices. An SLM modulates the intensity of the projected light by controlling optical elements to manipulate the light and accordingly form the pixels of a displayed image. In an example of a DMD, the optical elements are adjustable tilting micromirrors that are tilted by applying voltages to the micromirrors, such as through respective electrodes. The micromirrors are tilted to project dark pixels, bright pixels, or shades of light per pixel. In liquid crystal-based SLMs, the optical elements are liquid crystals that are controlled by voltage to modulate the intensity of light across the image pixels. For example, an LCoS or FLCoS device includes liquid crystals on a reflective layer, which form optical elements that are controlled to reflect and modulate the intensity of light in the image pixels. The intensity of light is modulated by applying voltage to the liquid crystals, which reorients the crystals, also referred to herein as switching the crystals, and accordingly controls the amount of light projected per pixel. The optical elements of an LCD are formed of a transmissive array of liquid crystal cells that can be controlled, such as by voltages (e.g., through respective electrodes), to modulate light transmitted through the LCD.

A projection-based display system can also include multiple light sources, such as lasers, of different wavelengths to provide color modes (e.g., blue, green, and red) rather than a single broadband light source (e.g., lamp or light bulb). The projection of the color modes can be based on one of various display methods. For example, the light sources can be operated by simultaneously projecting color modes on the SLM surface to form the image. In other examples, light for different color modes is emitted in sequence in time by respective light sources. The color modes can be projected by time multiplexing the respective light sources to display an image in full color. The sequence of switching the light sources for the respective color modes is set at a rate sufficiently high to allow the human eye, also referred to herein as the human visual system (HVS), to integrate a sequence of projected colored modes of the image into a single colored image.

The projection-based display can also include a phase light modulator (PLM) positioned between the light sources and the SLM. A PLM modulates the phase of light to produce constructive and destructive interference of light waves which project bright and dark pixels, respectively, in the image. PLMs include MEMS devices. A MEMS based PLM can include micromirrors that have adjustable heights with respect to the PLM surface. The heights of the micromirrors can be adjusted by applying voltages. The micromirrors can be controlled with voltage to form a diffraction surface on the PLM. Each micromirror can be coupled to respective electrodes for applying a voltage and controlling the micromirror independently from the other micromirrors of the PLM. The heights of the micromirrors are adjusted, such as by controlling the voltages applied to each micromirror or changing the voltage load area for the micromirrors, to form a certain hologram by the diffraction surface. The hologram is a phase altering reflective surface to incident light from light sources such as lasers. The hologram modulates the incident light on the surface of the PLM to project illumination patterns of light onto the SLM to form a respective image. The diffraction surface can also be adjusted to change the angle by which the incident light is reflected with respect to the surface of the PLM, also referred to herein as a diffraction angle. In other examples, PLMs can include liquid crystal devices, such as LCoS and FLCoS devices. Liquid crystal cells in the LCoS or FLCoS based PLMs can be controlled, by respective voltages, to modulate the phase of light to produce the bright and dark pixels in the projected image.

The incident light reflected from the PLM onto the SLM, also referred to herein as backlight, can be modulated according to a high dynamic range (HDR) modulation that increases brightness in image pixels. Increasing image pixel brightness also increases contrast between dark and bright pixels of the image. According to the HDR modulation, the PLM modulates the backlight on certain areas on the surface of the SLM to project bright pixels in the image projected by the SLM. The remaining areas on the SLM surface are not illuminated by the backlight, causing the projection of dark pixels in the image. The backlight from the PLM is modulated by the SLM to produce a modulated light for projecting the image.

The light sources that provide the color modes to the PLM can be lasers. A laser is a coherent light source useful to emit coherent light for a color mode at a certain respective wavelength. The coherent light emitted by each laser is composed of light waves with the same frequency and wavelength, and that have the same phase or a fixed phase difference. The lasers can have higher cost than other light sources. For example, green and red lasers can have higher cost than lamps, light emitting diodes (LEDs), and blue lasers. Green and red light lasers can also be more difficult to manufacture, and accordingly have lower volume of production and are less available in comparison to other light sources. Generally, lasers can be less power efficient for providing consistent white light intensity, also referred to herein as photopic light, than other light sources such as LEDs or lamps. For example, lasers can provide photopic efficiencies of approximately 200 lumens per watt (lm/W) for white light. Other light sources such as LEDs and lamps can provide higher photopic efficiencies of approximately 300 lm/W for white light. Accordingly, lasers can require more power to produce the same brightness as other light sources, which can increase heating in the system and require more thermal control.

Illuminating a PLM with multiple color modes also requires tuning the voltages to adjust the micromirrors of the PLM for each color mode differently, which can reduce the diffraction efficiency for the other color modes. For example, tuning the voltages to adjust the PLM micromirrors for green light can reduce the diffraction efficiency of the PLM for red and blue light. The diffraction efficiency represents the amount of light produced in certain diffraction orders by the PLM. The diffraction orders are produced by scattering the incident light on the PLM by the micromirrors that form a diffraction grating on the surface of the PLM. The backlight from the PLM can be projected on the SLM in one or more diffraction orders. For example, the backlight can be transmitted in a central order from the diffraction orders, also referred to herein as a zero order, or in a diffraction order around the zero order.

The spot size of the backlight on the SLM can be measured by a point spread function (PSF), which is related to the Etendue of the light source within the optical system. The Etendue is a measure of light spreading in the system based on the illumination area and the far field angular divergence of light. The incident light is expanded in the near field by the optical system to illuminate the PLM, which projects the backlight in the far field onto the SLM. Based on the relation between the PSF and the Etendue, increasing the PLM size and maintaining a certain Etendue of the system can reduce the far field angular divergence of backlight and accordingly the far field PSF on the SLM.

In HDR modulation, the contrast can be increased if the PSF is reduced to a spot size limited to a single SLM pixel. Based on the relation between the PSF and the Etendue, the PSF or the spot size on the SLM, also referred to herein as the illumination zone, can be smaller if the Etendue of the laser is smaller. For example, a blue laser has a smaller Etendue than green and red lasers. Accordingly, the illumination zone of blue laser light on the surface of the SLM is smaller than green and red laser light. This causes higher contrast in blue laser light in comparison to green and red laser light in the projected image.

This description includes examples for providing light by a phosphor as a light source to replace lasers, such as red and green lasers, in projection-based displays for illuminating the PLM and SLM. The phosphor includes a luminescence material that emits light (e.g., glows) when exposed to a radiant energy such as light from another light source. The system also includes a blue laser for providing the radiant energy to the phosphor to emit light, also referred to herein as exciting the phosphor. The light emitted by the phosphor has a broader wavelength spectrum than lasers. For example, the phosphor can emit white (photopic) light including multiple color modes (e.g., blue, green, and red). The multiple color modes in the white light can be separated by respective optical filters that are optically coupled to the phosphor and the SLM. In other examples, the phosphor emits yellow light where green and red color modes can be separated by two respective optical filters. The blue color mode can be provided by a blue laser. The PLM is positioned to direct and steer incident light from the blue laser to excite areas of the phosphor. The phosphor then emits white or yellow light, which can be optically filtered to transmit each color mode to the SLM.

Replacing green and red lasers with the phosphor is useful to reduce cost in the display system. The speckle in the displayed image also decreases because the light produced by the phosphor is noncoherent light and does not cause speckle in the projected image. Speckle is a random interference pattern in an image produced when coherent light scatters through the optical system and recombines at the image plane. For example, green and red light speckle can be more noticeable to the HVS than blue light speckle. The speckle in the image that is caused by the coherent light from the blue laser may not be noticeable to the HVS. The phosphor is also more available than lasers and emits light with higher photopic efficiency. Reducing the number of lasers in the system to a single blue laser also allows controlling the PLM micromirrors by voltages that are tuned to increase the diffraction efficiency for the blue color mode without the other color modes. The HDR modulation can also be higher based on the Etendue of the blue laser.

FIG. 1 is a diagram of a display system 100, in accordance with various examples. The display system 100 may be a projection-based display system for projecting images or video, such as according to HDR modulation. The display system 100 includes a display device 110 which is configured to project a modulated light 120 onto an image projection surface 130 for viewing the images or video. Examples of the image projection surface 130 include a wall or a viewing screen. For example, the viewing screen may be a wall mounted screen, a screen of a heads up displays (HUD), an augmented reality (AR) or virtual reality (VR) display, a three-dimensional (3D) display screen, a projection surface in a vehicle such as for a windshield projection display, or other display surfaces for projection-based display systems.

The modulated light 120 may be modulated by the display device 110 to project still images or moving images, such as video, onto the image projection surface 130. The modulated light 120 may be formed as a combination of light with multiple color modes provided by the display device 110. The display device 110 includes an SLM 140 for modulating and projecting the modulated light 120. The display device 110 also includes light sources for providing light with multiple color modes (e.g., blue, green, and red). The light sources include one or more blue lasers 150 and a phosphor 155. The one or more blue lasers 150 provide blue light 160 which is modulated by a PLM 165. The blue light 160 provides optical coupling between the one or more blue lasers 150 and the PLM 165. A first portion of the modulated blue light 160 can be projected as a blue color mode light 170 with phosphor light 175, which can be white or yellow light, from the phosphor 155 to the SLM 140. The blue color mode light 170 represents an optical connection between the PLM 165 and the SLM 140. The phosphor 155 can be excited by a light 173, at least a portion of blue light 160 to produce the phosphor light 175. The light 173 represents an optical connection between the PLM 165 and the phosphor 155. The light 173 is blue light which has been modulated by the PLM 165 and may be transformed to other color modes by the phosphor 155. The phosphor light 175 includes further color modes, such as green and red color modes, which can be filtered from the phosphor 155 and transmitted to the SLM 140 with the blue color mode light 170. The phosphor light 175 represents an optical connection between the phosphor 155 and the SLM 140. The SLM 140 modulates the blue color mode light 170 and the other color modes from the phosphor light 175 to project the modulated light 120 with multiple color modes on the image projection surface 130. The components of the display device 110 which exchange light are referred to herein as optically coupled components. The optically coupled components in the display device 110, including the SLM 140, blue lasers 150, phosphor 155, and PLM 165, form an apparatus 180 for projecting the modulated light 120. In FIG. 1, the optical connections between the optically coupled components are shown by respective arrows.

The display device 110 also includes one or more controllers 190 for controlling the components of the display device 110 to display the images or video. For example, the one or more controllers 190 control the PLM 165 to modulate the blue light 160 from the one or more blue lasers 150. The one or more controllers 190 also control the one or more blue lasers 150 to produce the blue light 160. The SLM 140 is controlled by the one or more controllers 190 to modulate the blue color mode light 170 and the other color modes to provide the modulated light 120. In FIG. 1, the electrical connections between the controllers 190 and the other components of the display device 110 are shown by respective dotted lines. The controllers 190 can also include or can be coupled to a processor 193, which is configured to coordinate between the controllers 190 based on processing digital data of the image. The processor 193 can process an image to produce a processed image for display. The controllers 190 then control the one or more blue lasers 150, the PLM 165, and the SLM 140 according to the processed image. In examples, the phosphor can be part of a wheel (not shown in FIG. 1) configured to rotate at a certain speed to project the phosphor light 175 at a respective rate. The wheel, also referred to herein as a phosphor wheel, can be coupled to the one or more controllers 190 for controlling the rotation of the wheel.

The display device 110 may further include one or more input/output devices (not shown), such as an audio input/output device, a key input device, a display, and the like. The display device 110 can include a cover 195 through which the modulated light 120 is projected from the display device 110. The cover 195 is a transparent cover made of a dielectric material, such as glass or plastic. The cover 195 also protects the components of the display device 110 from outside elements.

Figure 2:
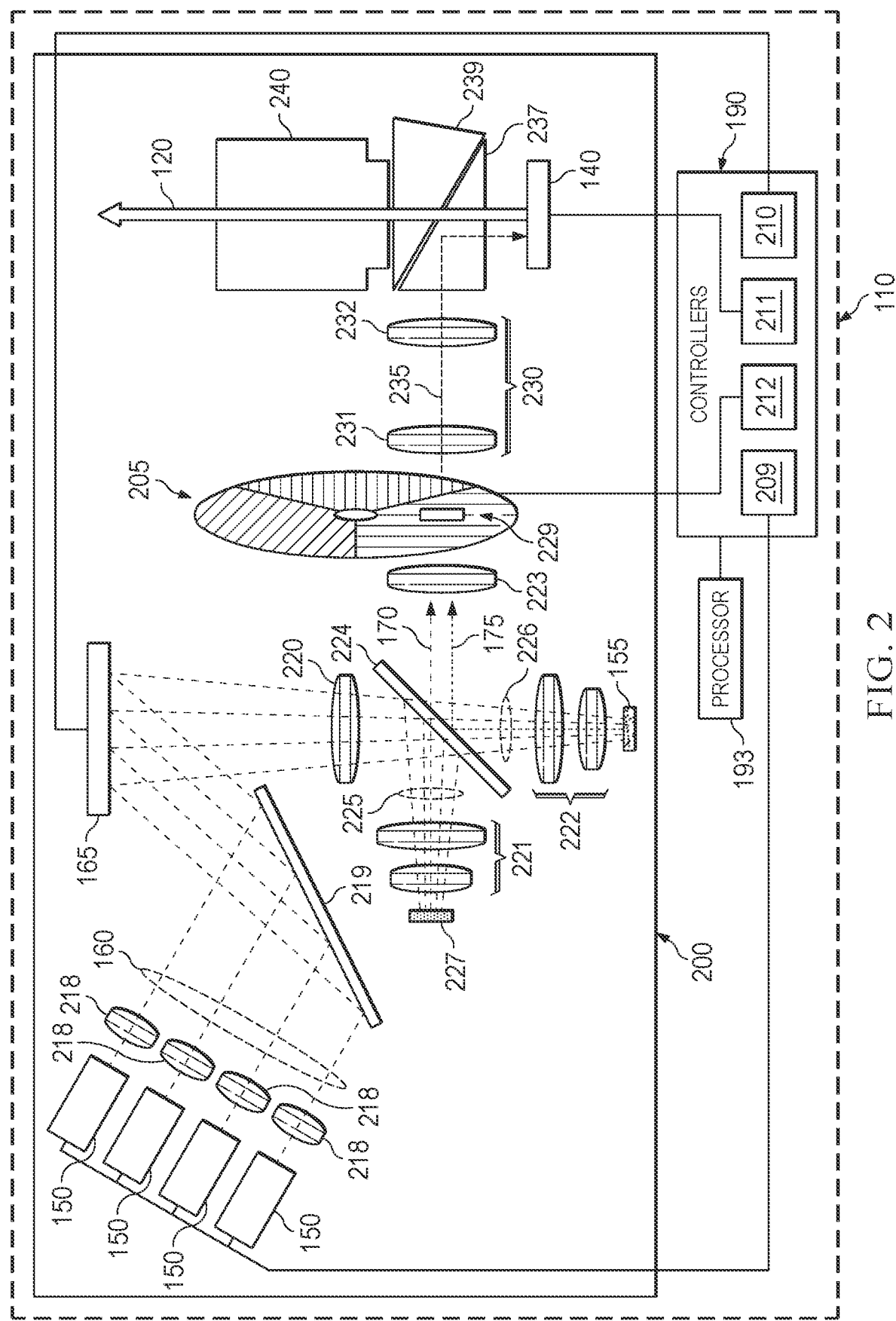
FIG. 2 is a diagram of an apparatus of a display device of the display system of FIG. 1, in accordance with various examples.

FIG. 2 is a diagram of an apparatus 200 for projecting modulated light, in accordance with various examples. For example, the apparatus 200 is an example of the apparatus 180 of the optically coupled components in the display device 110. The display device 110 also includes the one or more controllers 190 which are coupled to the apparatus 200. The apparatus 200 includes the SLM 140, one or more blue lasers 150, phosphor 155, and PLM 165 in the display device 110. The PLM 165 is optically coupled to the one or more blue lasers 150 and the phosphor 155. The apparatus 200 can also include a color wheel 205 that is optically coupled to the SLM 140, phosphor 155, and PLM 165.

In examples, as shown in FIG. 2, the one or more controllers 190 may include a first controller 209 for controlling the one or more blue lasers 150, a second controller 210 for controlling the PLM 165, a third controller 211 for controlling the SLM 140, and a fourth controller 212 for controlling the rotation of color wheel 205. The controllers 190 are coupled to the processor 193 which coordinates between the controllers 190 to modulate, by the PLM 165, the blue light 160 that is transmitted from the one or more blue lasers 150. The processor 193 also coordinates between the controllers 190 to control the SLM 140 and the color wheel 205 and accordingly modulate light projected from the PLM 165 and the phosphor 155.

The first controller 209 can be a digital controller configured to switch the one or more blue lasers 150 on and off, or an analog controller that controls and changes the level of light intensity of the blue light 160 from the one or more blue lasers 150. In examples, the PLM 165 can be a MEMS based PLM that includes micromirrors. The analog controller can also transmit pulse width modulation (PWM) signals to the PLM 165 to synchronize the switching of the micromirrors of the PLM 165 with the transmission of blue light 160 from the blue lasers 150. The second controller 210 may be an analog or digital controller that can switch the micromirrors of the PLM 165 between multiple heights. In examples, the second controller 210 is a digital controller coupled to a static random access memory (SRAM) (not shown) including an array of memory cells each configured to store voltage values (e.g., in bits) to adjust respective micromirrors of the PLM 165. The voltage values are useful to switch the micromirrors to discrete heights. In other examples, the PLM 165 is a liquid crystal based device, such as an LCoS or a FLCoS device, which includes an array of liquid crystal cells. The liquid crystal cells can be switched by respective voltage values of the SRAM cells to orient the crystals in certain directions and accordingly modulate the phase of light.

The third controller 211 controls optical elements (not shown) of the SLM 140, such as micromirrors of a DMD or liquid crystals of an FLCoS. For example, if the SLM 140 is a DMD, the optical components are adjustable tilting micromirrors that are tilted by applying voltages. The third controller 211 may be a digital controller that switches each of the micromirrors between an on-state and an off-state. The on-state can tilt a micromirror at a first angle to reflect/project light to provide a bright pixel in the image, and the off-state can tilt the micromirrors at a second angle to stop reflecting/projecting light and accordingly provide a dark pixel in the image. The third controller 211 can include or be coupled to an SRAM (not shown) with memory cells each configured to store, in bits, a voltage to control a respective micromirror of the SLM 140. The one-bit value is useful to switch a respective micromirror of the SLM 140 between the on-state for reflecting/projecting light and the off-state to stop reflecting/projecting light. For example, a zero-bit value can switch the optical element to an off-state and a one-bit value can switch the optical element to an on-state. In other examples, the SLM 140 is a LCoS, FLCoS or LCD, and the optical elements are liquid crystals that are controlled by voltage to modulate the intensity of light across the image pixels. The on-state can cause transmitting or reflecting light by the liquid crystals, and the off-state can cause blocking the light by the liquid crystal.

The one or more blue lasers 150 and the PLM 165 can be optically coupled by one or more sets of collimating optics 218 and a reflector surface (e.g., a mirror) 219. Each set of collimating optics 218 is optically coupled to a respective blue laser 150 and the reflector surface 219. For example, FIG. 2 shows four blue lasers 150 and four respective sets of collimating optics 218. In other examples, the apparatus 200 can include any other number of blue lasers 150 and respective collimating optics 218. For example, the apparatus 200 can include one, two, three or more blue lasers 150 and respective collimating optics 218. Each set of collimating optics 218 can include a single lens, as shown in FIG. 2, or can include multiple lenses in other examples. Each set of collimating optics 218 is configured to project and collimate a respective beam of blue light 160 from a respective blue laser 150 to the reflector surface 219, which reflects the respective beam of blue light 160 to the surface of the PLM 165. The lenses of the collimating optics 218 can determine the illumination zone of the beams of blue light 160 on the surface of the PLM 165.

If the PLM 165 is a MEMS based PLM, the PLM 165 can include adjustable micromirrors which form a grid of pixels on the surface of the PLM 165. The heights of the micromirrors with respect to the surface can be adjusted by applying voltages to the PLM 165. The second controller 210 controls the PLM 165 by changing the voltages applied to the PLM 165 to adjust the heights of the micromirrors to produce a hologram. The hologram is formed by a diffraction surface that is formed by providing different heights of the micromirrors across the grid of pixels on the surface of the PLM 165. The diffraction surface modulates and reflects the blue light 160 from each blue laser 150 towards the phosphor 155 and the SLM 140. The micromirrors can be adjusted to reflect the beams of blue light 160 from the respective blue laser 150 at respective diffraction angles from the surface of the PLM 165 in the direction of the phosphor 155. The diffraction angles are determined by the diffraction surface to steer the beams of blue light 160. The micromirrors can be adjusted to steer the beams of blue light 160 from the respective blue lasers 150 simultaneously onto the phosphor 155.

In other examples, the PLM 165 is a liquid crystal based PLM, such as an LCoS or FLCoS. For example, an FLCoS includes ferroelectric liquid crystals (FLCs) that have a faster voltage response than other liquid crystal devices (e.g., LCoS and LCDs) and can project images at a rate above 1 kHz. The FLCs are placed between a glass layer and a pixelated reflective complementary metal oxide semiconductor (CMOS) chip. The CMOS chip includes an array of fixed micromirrors, such as aluminum micromirrors, and a circuit configured to receive video signals and convert the signals into voltages. The voltages are independently applied to each of the micromirrors that switch a respective cell of FLCs to project a pixel of the image. Depending on the voltage applied to each pixel, the FLCs can be oriented in certain respective directions, which modulates the polarization of the blue light 160 that is reflected by the micromirrors and transmitted through the FLC cells. The FLC cells project the blue light 160 from the blue lasers 150 towards the phosphor 155.

The apparatus 200 also includes focusing optics including first optics 220, second optics 221, third optics 222, and fourth optics 223. The apparatus 200 further includes a dichroic mirror 224 positioned between the first optics 220, second optics 221, third optics 222, and fourth optics 223. The beams of blue light 160, which are reflected from the PLM 165, are projected by the first optics 220 towards the dichroic mirror 224. The first optics 220 can include a single lens, as shown in FIG. 2, or can include multiple lenses in other examples. For each beam of blue light 160, the dichroic mirror 224 provides a reflective surface that is configured to reflect a first portion 225 of the beams of blue light 160 from the first optics 220 to the second optics 221 and transmit a second portion 226 of blue light 160 to the third optics 222. In examples, the first portion 225 of blue light 160 can be less than 10 percent (%) (e.g., 4% or 5%) of the blue light 160. In other examples, the first portion 225 can be larger than 10% (e.g., within 20% to 50%) of the blue light 160.

For each beam of blue light 160, the first portion 225 that is reflected by the dichroic mirror 224 is then projected by the second optics 221 to a diffuser 227. As shown in FIG. 2, the first optics 220, second optics 221, third optics 222, and fourth optics 223 can be placed between the PLM 165, the phosphor 155, the diffuser 227, and the color wheel 205. The second optics 221 can include multiple lenses, as shown in FIG. 2, or can include a single lens in other examples. The diffuser 227 provides a reflective surface that is configured to diffuse and reflect the first portion 225 for each beam of blue light 160 to the dichroic mirror 224, through the second optics 221. Diffusing the blue light 160 causes scrambling of the light waves in the blue light 160, which reduces spatial coherence in the blue light 160 and accordingly speckle in the image formed by the blue light 160. The first optics 220 and second optics 221 are configured to focus the beams of blue light 160 steered from the PLM 165 to illuminate respective areas, also referred to as illumination zones, on the surface of the diffuser 227. The diffuser 227, in turn, diffuses the first portion 225 of blue light 160 and reflects back the blue color mode light 170 to the fourth optics 223 through the second optics 221 and the dichroic mirror 224.

The second portion 226 of blue light 160 that is transmitted by the dichroic mirror 224 is then projected by the third optics 222 onto the phosphor 155. The third optics 222 can include multiple lenses, as shown in FIG. 2, or can include a single lens in other examples. The first optics 220 and the third optics 222 are configured to focus the second portion 226 of the beams of blue light 160 from the PLM 165 to illuminate respective areas, also referred to as illumination zones, on the surface of the phosphor 155. The second portion 226 of the beams of blue light 160 excites the respective illumination zones of phosphor 155 to emit phosphor light 175.

The phosphor 155 is a reflective phosphor configured to emit the phosphor light 175 in the opposite direction to the received second portion 226 of blue light 160. For example, the phosphor light 175 can be yellow light or white light. The phosphor light 175 is emitted from the phosphor 155 to the dichroic mirror 224 through the third optics 222. Configuring the phosphor 155 as a reflective phosphor in the apparatus 200 can allow direct cooling of the phosphor 155 to increase heat control. For example, the back surface of the phosphor 155, at the opposite side from the reflective surface, can be directly coupled to a heat sink configured for cooling the phosphor 155.

The dichroic mirror 224 transmits the blue color mode light 170 from the second optics 221 to the fourth optics 223, and also reflects the phosphor light 175 from the third optics 222 to the fourth optics 223. The blue color mode light 170 and the phosphor light 175 are then focused by the fourth optics 223 to an image plane 229 at the focus point of the fourth optics 223. The focus point and the image plane 229 can be located at the color wheel 205. In other examples, the color wheel 205 can be positioned between the fourth optics 223 and the image plane 229. The fourth optics 223 can include a single lens, as shown in FIG. 2, or can include multiple lenses in other examples.

In the apparatus 200, the areas on the surfaces of the diffuser 227 and the phosphor 155 which are illuminated by the same beams of blue light 160 are projections of same respective areas on the surface of the PLM 165. The second optics 221 and the fourth optics 223 can image the illumination zones on the surface of the diffuser 227 to respective zones on the image plane 229. The illumination zones on the surface of the phosphor 155 can also be imaged to the same respective zones on the image plane 229 by the third optics 222 and the fourth optics 223. Accordingly, the blue color mode light 170 and the phosphor light 175 illuminate the same respective illumination zones on the image plane 229, forming a background image for the hologram of the PLM 165.

The color wheel 205 includes multiple optical filters, which are adjacent on the surface of the color wheel 205 facing the fourth optics 223, as shown in FIG. 2. The optical filters are configured to transmit different color modes of light at respective wavelengths from the fourth optics 223 to the SLM 140. For example, the color wheel 205 includes blue, green, and red optical filters that transmit the blue, green, and red color modes, respectively. The color wheel 205 is rotated, by one of the controllers 190 (e.g., the fourth controller 212) to switch between the optical filters at a certain speed and transmit the respective color modes in a sequence in time at a rate sufficiently high to allow the HVS to integrate the color modes in the modulated light 120 as a single image. For example, the projection rate, also referred to herein as the HVS rate for image integration, can be between 30 frames per second and 60 frames per second. The color wheel 205 selects and transmits the color modes from the blue color mode light 170 and the phosphor light 175, which are projected by the fourth optics 223 in the image plane 229. For example, if the phosphor light 175 is yellow light, the color wheel 205 rotates to select and transmit in a time sequential manner the blue color mode light 170 and the green and red color modes from the phosphor light 175. In other examples, the color wheel 205 can be positioned between the fourth optics 223 and the image plane 229.

In further examples, the phosphor 155 is a white phosphor and the phosphor light 175 produced by the phosphor 155 is white light that includes a blue color mode with the green and red color modes. A partial dichroic mirror can be configured to reflect the phosphor light 175 including the blue, green, and red color modes from the phosphor 155 toward the SLM 140, and also transmit the blue color mode light 170 from the diffuser 227 toward the SLM 140. Accordingly, the SLM 140 can receive a combination of the blue color mode in the phosphor light 175 and the blue color mode light 170.

The apparatus 200 further includes illumination optics 230 with one or more lenses between the image plane 229 and the SLM 140. The illumination optics 230 project the color modes of the blue color mode light 170 and the phosphor light 175 from the image plane 229 onto the surface of the SLM 140. The illumination optics 230 are configured to image the illumination zones that form the background image in the image plane to a background image on the SLM 140. For example, as shown in FIG. 2, the illumination optics 230 can include a first lens 231 that collimates, for each color mode, a spreading or defocused illumination light beam 235 from the image plane 229, and a second lens 232 that focuses the collimated illumination light beam 235 from the first lens 231 onto the SLM 140. The first lens 231 and second lens 232 can image the background image by projecting the illumination light beam 235 for each color mode from the image plane 229 onto the surface of the SLM 140. In other examples, the illumination optics 230 can include fewer or more than two lenses to project and adjust the illumination zone of the illumination light beam 235 from the image plane 229 on the SLM 140.

The apparatus 200 may also include a first prism 237 positioned between the illumination optics 230 and the SLM 140, and a second prism 239 positioned between the first prism 237 and projection optics 240. The first prism 237 directs, by total internal reflection (TIR), the illumination light beam 235 for each color mode from the illumination optics 230 onto the SLM 140. The SLM 140 modulates the color modes in the respective illumination light beam 235 to produce the modulated light 120. The illumination light beam 235 is internally reflected, in the first prism 237, at the facing surfaces of the first prism 237 and second prism 239, which also allows the transmission of the modulated light 120 from the SLM 140 to the projection optics 240. The facing surfaces of the first prism 237 and second prism 239 are separated by an air gap, which causes the TIR of the illumination light beam 235 in the first prism 237. The three color modes transmitted by the color wheel 205 to the SLM 140 are projected in the modulated light 120 by time multiplexing the respective illumination light beams 235 within the HVS rate to display an image in full color. The modulated light 120 can be projected through the projection optics 240 to the image projection surface 130 to display the image. The projection optics 240 can include a single projection lens or multiple lenses.

In other examples, the blue lasers 150 and the PLM 165 can be optically coupled by optical fibers. Each optical fiber can be coupled to a respective blue laser 150 and to the PLM 165. Each optical fiber is configured to transmit and direct the blue light 160 from the respective blue laser 150 to project the blue light 160 on the PLM 165. Transmitting the blue light 160 through an optical fiber can reduce the local intensity variations in the light beam profile of the blue light 160 and produce a more uniform intensity profile. The uniform intensity profile of the light beam at the output of the optical fiber provides a uniform illumination on the surface of the PLM 165 and accordingly a higher quality image projection.

In other examples, the display device 110 may include multiple SLMs 140, for modulating and projecting different color modes simultaneously from the one or more blue lasers 150 and the phosphor 155. For example, the display device 110 can include two or three SLMs that modulate different color modes to increase the intensity of the projected color modes and accordingly increase image brightness and contrast and the power efficiency of the display device 110. For example, the display device 110 can include two SLMs 140 where one of the SLMs 140 is configured to modulate two color modes (e.g., blue and green) and the other SLM 140 is configured to modulate a third color mode (e.g., red). In other examples, the display device 110 includes three SLMs 140 that each modulates a respective color mode. The SLMs 140 are coupled to and controlled by the controllers 190. For example, the SLM 140 can be controlled by the same third controller 211 or each SLM 140 can be controlled by a respective controller 211.

Figure 3:
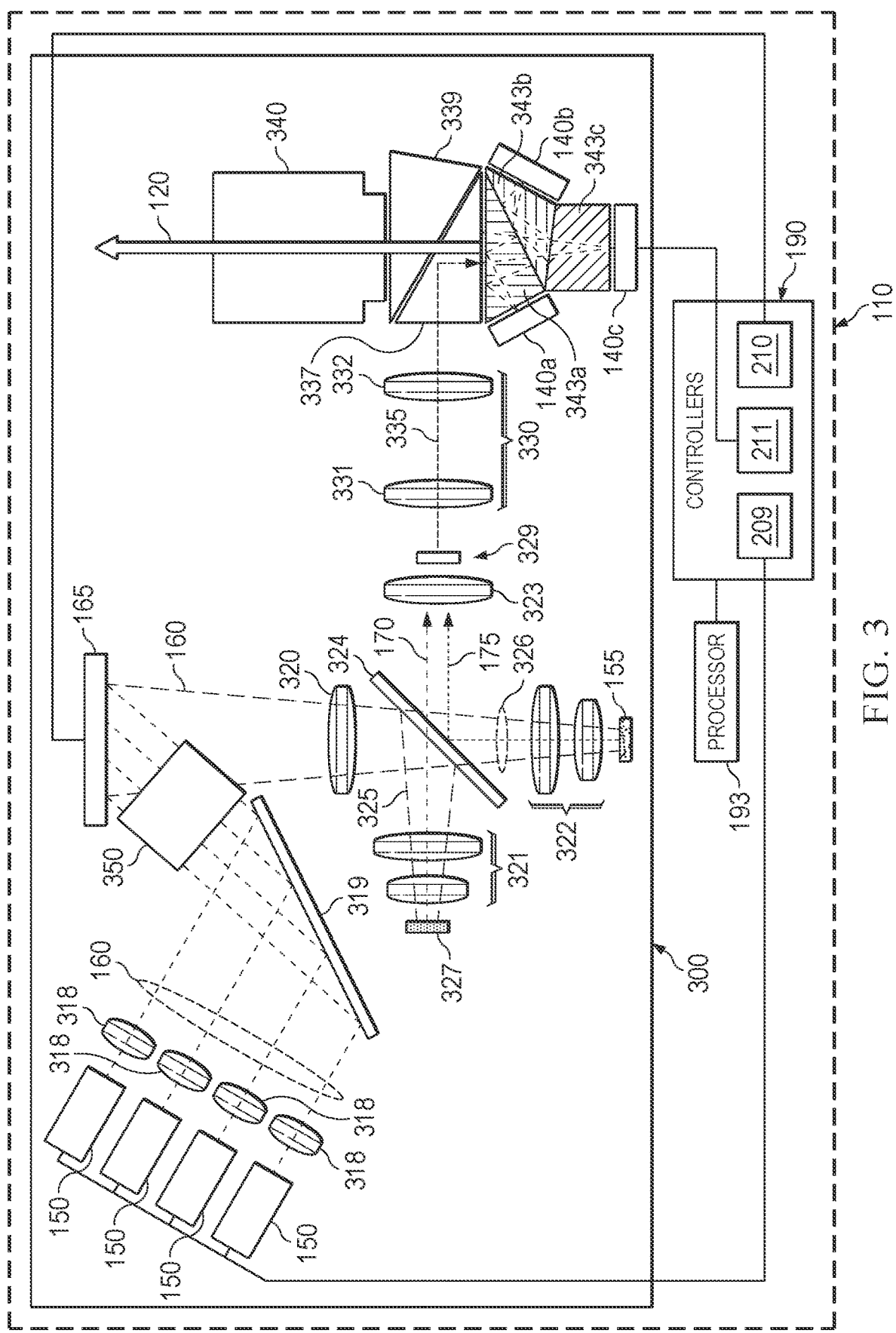
FIG. 3 is a diagram of an apparatus of a display device of the display system of FIG. 1, in accordance with various examples.

FIG. 3 is a diagram of an apparatus 300 of the display device 110, in accordance with various examples. For example, the apparatus 300 is an example of the apparatus 180 of the optically coupled components in the display device 110. The display device 110 also includes the one or more controllers 190 which are coupled to the apparatus 300. The apparatus 300 includes three SLMs 140 with the one or more blue lasers 150, the phosphor 155, and the PLM 165 which are coupled to the one or more controllers 190. The controllers 190 include the first controller 209, second controller 210, and third controller 211, which are coupled to the processor 193. The apparatus 300 can also include other components similar to the components of the apparatus 200. The components of the apparatus 300 include one or more sets of collimating optics 318 and a reflector surface 319 that are optically coupled to the one or more blue lasers 150 and the PLM 165 with the micromirrors 215. The apparatus 300 can include any number of blue lasers 150. For example, the apparatus can include four blue lasers 150, as shown in FIG. 3. The collimating optics 318 and reflector surface 319 are configured to project and collimate beams of blue light 160 from the respective blue lasers 150 on the micromirrors 215 of the PLM 165.

The apparatus 300 can also include an optical homogenizer 350 between the one or more blue lasers 150 and the phosphor 155 and the PLM 165. For example, the optical homogenizer 350 can be positioned between the reflector surface 319 and the PLM 165, as shown in FIG. 3. The optical homogenizer 350 is configured to collimate the beams into a single collimated beam of blue light 160 that illuminates the PLM 165. The optical homogenizer 350 is an optical component that produces, at the output, a light beam with a uniform intensity profile. The uniform intensity profile is obtained by eliminating the local intensity variations in the light beam profile as the light is transmitted through the optical homogenizer 350. In examples, the optical homogenizer 350 can be a light tunnel (e.g., a dielectric waveguide) or an integrator rod (e.g., a glass rod). The uniform intensity profile of the collimated light beam at the output of the optical homogenizer 350 provides a uniform illumination on the surface of the PLM 165 with reduced variations in the intensity of blue light 160 across the surface.

The apparatus 300 also includes focusing optics including first optics 320, second optics 321, third optics 322, fourth optics 323, and a dichroic mirror 324 that are optically coupled to the PLM 165 and the phosphor 155. The first optics 320 project the blue light 160 from the PLM 165 towards the dichroic mirror 324. The dichroic mirror 324 reflects, for each beam, a first portion 325 of blue light 160 from the first optics 320 to the second optics 321, and transmits a second portion 326 of blue light 160 to the fourth optics 323. In turn, the second optics 321 projects the first portion 325 of blue light 160 to a diffuser 327, and the third optics 322 project the second portion 326 of blue light 160 onto the phosphor 155. The dichroic mirror 324 then transmits the blue color mode light 170 provided by the diffuser 327 to the fourth optics 323, and reflects phosphor light 175 emitted by the phosphor 155 to the fourth optics 323. The blue color mode light 170 and the phosphor light 175 are focused by the fourth optics 323 to an image plane 329 at the focus point of the fourth optics 323. Accordingly, a background image for the hologram of the PLM 165 is formed on the image plane 329.

The apparatus 300 also includes illumination optics 330 with one or more lenses between the image plane 329 and the SLMs 140. The illumination optics 330 project an illumination light beam 335, which includes the blue color mode light 170 and the phosphor light 175, from the image plane 329 onto the SLMs 140. The illumination optics 330 can include a first lens 331 and a second lens 332 that image the background image from the image plane 329 onto the surfaces of the SLMs 140. The apparatus 300 also includes a first prism 337 positioned between the illumination optics 330 and the SLMs 140, and a second prism 339 positioned between the first prism 337 and projection optics 340. A prism filter 343 is also positioned between each SLM 140 and the first prism 337 to transmit a respective color mode in the illumination light beam 335 to the respective SLM 140. Each prism filter 343 also transmits the respective color mode modulated by the respective SLM 140 to provide the modulated light 120 to the projection optics 340.

Each prism filter 343 is configured to direct a color mode of the illumination light beam 335 to a respective SLM 140, and transmit the other color modes towards the other SLMs 140. As shown in FIG. 3, the SLMs 140 include a first SLM 140a, a second SLM 140b, and a third SLM 140c. The prism filters 343 include a first prism filter 343a, a second prism filter 343b, and a third prism filter 343c. The first prism filter 343a is optically coupled to the first SLM 140a and configured to direct the red color mode in the illumination light beam 335 from the first prism 337 to the first SLM 140a, and transmit the other color modes in the illumination light beam 335 towards the second SLM 140b and third SLM 140c. The second prism filter 343b is optically coupled to the first prism filter 343a and the second SLM 140b. The second prism filter 343b is configured to direct to the second SLM 140b the blue color mode in the illumination light beam 335 which is transmitted by the first prism filter 343a, and to transmit the remaining green color mode to the third SLM 140c. The third prism filter 343c is optically coupled to the second prism filter 343b and the third SLM 140c. The third prism filter 343c is configured to transmit to the third SLM 140c the green color mode in the illumination light beam 335 which is transmitted by the second prism filter 343b. The third prism filter 343c also transmits the green color mode from the third SLM 140c to the second prism filter 343b. The second prism filter 343b is configured to transmit the blue color mode from the second SLM 140b with the green color mode from the third prism filter 343c to the first prism filter 343a. The first prism filter 343a is configured to transmit the red color mode from the first SLM 140a with the green and blue color modes from the second prism filter 343b to the first prism 337. The second prism 339 transmits the color modes that form the modulated light 120 from the first prism 337 to the projection optics 340. The modulated light 120 is projected through the projection optics 340 to the image projection surface 130 to display an image.

The multiple SLMs 140 and respective prism filters 343 in the apparatus 300 allow the transmission, modulation, and projection of the color modes in the modulated light 120 simultaneously without moving or mechanical components such as a color wheel. Removing such components can reduce noise in the system and accordingly increase image quality. The multiple SLMs 140 and respective prism filters 343 can also increase cost or size of the system. In other examples, the blue light 160, blue color mode light 170, and phosphor light 175 in the apparatus 200 (or 300) can be directed between the components of the apparatus 200 (or 300) by more or fewer optics and optical paths than shown in FIG. 2 (or FIG. 3). For example, to reduce size and cost of optics in the display device 110, the blue light 160 can be projected from the blue lasers 150 to the PLM 165 in an optical path without the reflector surface 219 (or 319).

Figure 4:
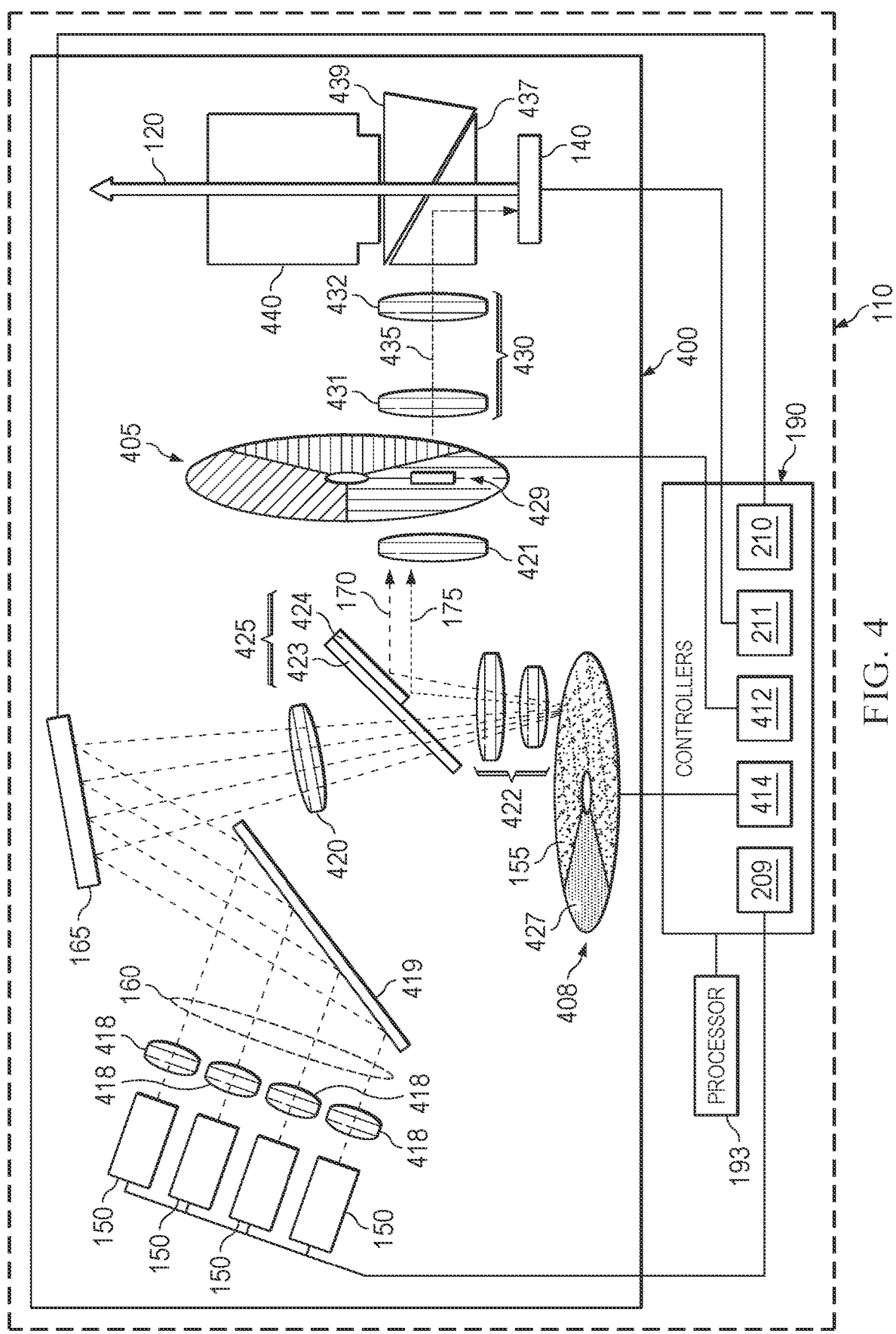
FIG. 4 is a diagram of an apparatus of a display device of the display system of FIG. 1, in accordance with various examples.

FIG. 4 is a diagram of an apparatus 400 of the display device 110, in accordance with various examples. For example, the apparatus 400 is an example of the apparatus 180 of the optically coupled components in the display device 110. The display device 110 also includes the one or more controllers 190 which are coupled to the apparatus 400. The apparatus 400 includes the SLM 140, one or more blue lasers 150, the PLM 165, and the phosphor 155, which are coupled to the one or more controllers 190. The phosphor 155 is positioned on a phosphor wheel 408 that is optically coupled to the PLM 165 and the color wheel 405. The apparatus 400 also includes a color wheel 405 positioned between the PLM 165 and the SLM 140. The controllers 190 can include the first controller 209 for controlling the blue lasers 150, the second controller 210 for controlling the PLM 165, and the third controller 211 for controlling the SLM 140. The controllers 190 are coupled the processor 193. The controllers 190 can also include a fourth controller 412 for controlling the color wheel 405, and a fifth controller 414 for controlling the phosphor wheel 408.

The apparatus 400 also includes one or more sets of projection optics 418 and a reflector surface 419 configured to project and collimate blue light 160 from respective blue lasers 150 onto the micromirrors 215 of the PLM 165. The apparatus 400 further includes focusing optics including first optics 420, second optics 421, third optics 422, and a partial dichroic mirror 425, which are optically coupled to the PLM 165, the phosphor wheel 408, and the color wheel 405. The first optics 420 project the beams of blue light 160 from the PLM 165 towards the partial dichroic mirror 425. The partial dichroic mirror 425 is configured to transmit, through a first half of the partial dichroic mirror 425, the beams of blue light 160 from the first optics 420 to the phosphor wheel 408. The beams of blue light 160 are transmitted from the first half of the partial dichroic mirror 425 to the phosphor wheel 408 thought the third optics 422 which further project the beams onto the phosphor wheel 408. The partial dichroic mirror 425 is also configured to reflect, by a second half of the partial dichroic mirror 425, light projected from the phosphor wheel 408 to the second optics 421.

For example, as shown in FIG. 4, the partial dichroic mirror 425 can be formed of one or more first optical layers 423 configured to transmit the blue light 160 from the first optics 420 to the phosphor wheel 408 and reflect the green and red color modes in the phosphor light 175 from the phosphor wheel 408 to the second optics 421. The partial dichroic mirror 425 can also include a one or more second optical layers 424 on one half of the surface of the one or more first optical layers 423. The one or more second optical layers 424 are configured to reflect the blue light 160 from the phosphor wheel 408 to the second optics 421. In other examples, the partial dichroic mirror 425 can be replaced by a mirror configured to reflect the blue color mode light 170 and the phosphor light 175. The mirror, also referred to herein as an offset mirror, can be located at an offset position with respect the phosphor wheel 408 to allow an uninterrupted optical path for the blue light 160 from the PLM 165 to the phosphor wheel 408.

The phosphor wheel 408 is a reflective phosphor wheel that includes the phosphor 155 and a diffuser 427, which are adjacent on the surface of the phosphor wheel 408 facing the partial dichroic mirror 425. Both the phosphor 155 and the diffuser 427 are segments of the phosphor wheel 408. The beams of blue light 160 excite respective illuminated areas on the phosphor 155 to emit the phosphor light 175. The phosphor 155 can be yellow phosphor that emits phosphor light 175 that is yellow light including the green and red color modes. The phosphor light 175 is emitted from the phosphor 155 to the partial dichroic mirror 425. The beams of blue light 160 are also reflected by the diffuser 427 which having a reflective surface in the phosphor wheel 408. The diffuser 427 is configured to diffuse and reflect the blue color mode light 170 to the partial dichroic mirror 425. The blue color mode light 170 and the phosphor light 175 are projected in turn from the phosphor wheel 408 to the partial dichroic mirror 425 at a rate determine by the speed of rotation of the phosphor wheel 408. The phosphor wheel 408 is rotated, by one of the controllers 190 (e.g., the fifth controller 414) to switch between the phosphor 155 and the diffuser 427 for receiving the beams of blue light 160 from the PLM 165 through the first optics 420 and the partial dichroic mirror 425. The phosphor wheel 408 is rotated at a certain speed to provide the blue color mode light 170 and the phosphor light 175 in a sequence in time within the HVS rate for image integration. The partial dichroic mirror 425 in turn reflects the blue color mode light 170 and the phosphor light 175 from the phosphor wheel 408 to the second optics 421. The rotation of the phosphor wheel 408 can be useful to effectively smooth the reflection surfaces of the phosphor 155 and the diffuser 427, which can reduce speckle in the projected image. Spinning the phosphor wheel 408 is also useful to reduce heating of the phosphor 155 and the diffuser 427 and accordingly increase thermal control in the apparatus 400.

The blue color mode light 170 and the phosphor light 175 are then focused by the second optics 421 to an image plane 429 at the focus point of the second optics 421. The focus point and the image plane 429 can be located at the color wheel 405. The color wheel 405 is rotated, by one of the controllers 190 (e.g., the fourth controller 412), to switch between optical filters in the color wheel 405 for transmitting respective color modes. The color wheel 405 is rotated at a certain speed to transmit the color modes (e.g., blue, green, and red) from the blue color mode light 170 and the phosphor light 175, within the HVS rate for image integration.

The apparatus 400 further includes illumination optics 430 with one or more lenses between the image plane 429 and the SLM 140. The illumination optics 430 project the color modes in the blue color mode light 170 and the phosphor light 175 from the image plane 429 onto the surface of the SLM 140. The illumination optics 430 includes a first lens 431 and a second lens 432 that project an illumination light beam 435 from the image plane 429 to the SLM 140. In other examples, the illumination optics 430 can include fewer or more than two lenses to project and adjust the illumination area of the illumination light beam 435 from the image plane 429 onto the SLM 140.

The apparatus 400 also includes a first prism 437 and a second prism 439 positioned between the illumination optics 430 and the SLM 140. The first prism 437 and second prism 439 direct the illumination light beam 435 from the illumination optics 430 onto the SLM 140, and transmit the modulated light 120 from the SLM 140 to the projection optics 440. In other examples, the blue light 160, blue color mode light 170, and phosphor light 175 can be directed by fewer optics and optical paths than in the apparatus 400. For example, reducing the moveable or mechanical components, such as the phosphor wheel 408, in the display device 110 can reduce noise and increase image quality. In other examples, the diffuser 427 in the phosphor wheel 408 can be replaced by a mirror which reflects the blue light 160 without diffusing the light.

In further examples, the phosphor 155 can be configured to transmit the blue light 160, also referred to herein as transmissive phosphor, on an optical path between the PLM 165 and the SLM 140. The transmissive phosphor can be a yellow or white phosphor that is excited by the blue light 160 from the PLM 165 to emit yellow or white light, respectively, toward the SLM 140. The transmissive phosphor can be positioned on an optical path for transmitting the blue light 160 between the between the PLM 165 and the SLM 140.

Figure 5:
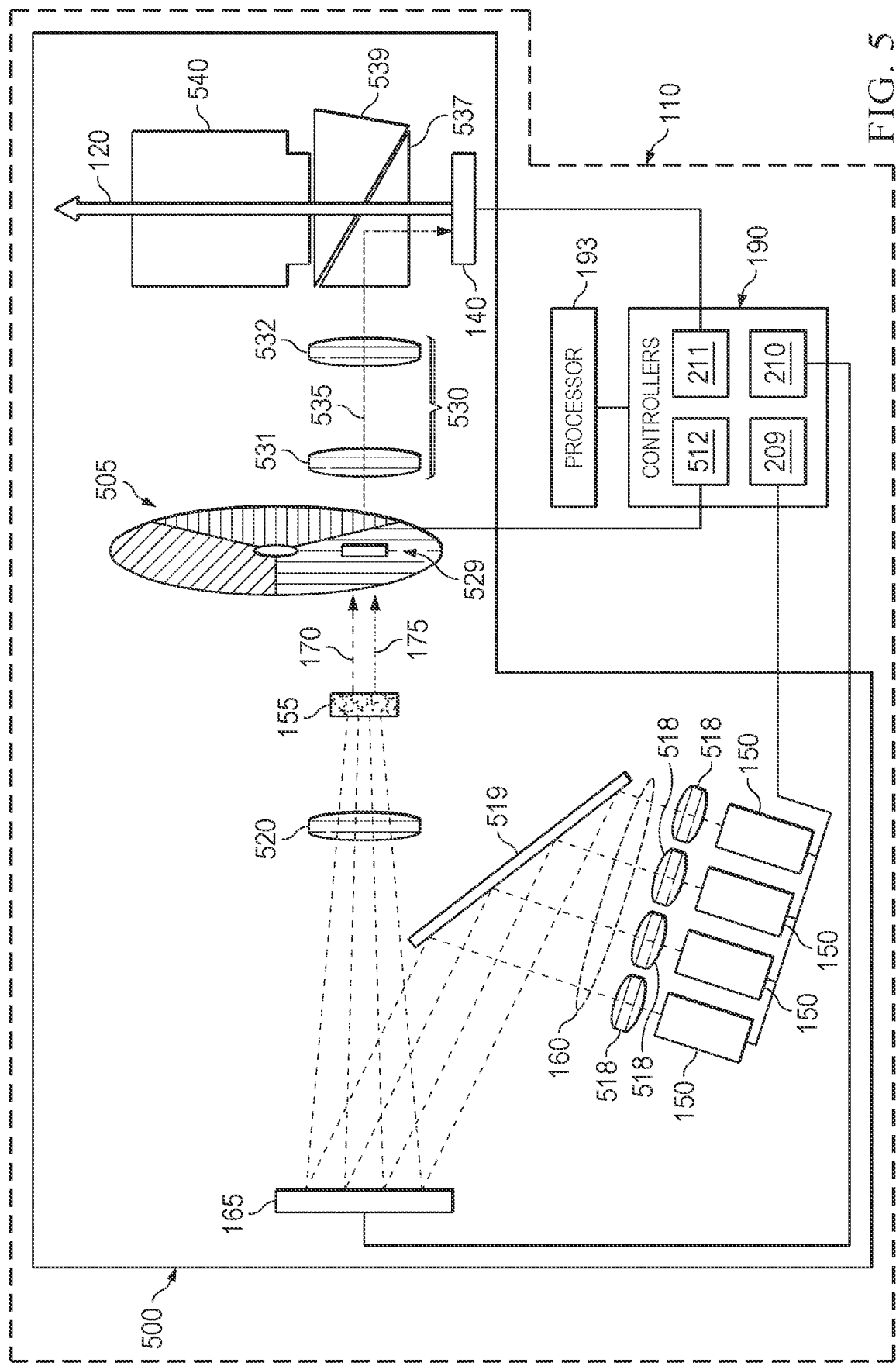
FIG. 5 is a diagram of an apparatus of a display device of the display system of FIG. 1, in accordance with various examples.

FIG. 5 is a diagram of an apparatus 500 of the display device 110 with a transmissive phosphor, in accordance with various examples. For example, the apparatus 500 is an example of the apparatus 180 of the optically coupled components in the display device 110. The display device 110 also includes the one or more controllers 190 which are coupled to the apparatus 500. The apparatus 500 includes the SLM 140, one or more blue lasers 150, the PLM 165, the phosphor 155, and a color wheel 505, which are coupled to the one or more controllers 190. The controllers 190 can include the first controller 209 for controlling the blue lasers 150, the second controller 210 for controlling the PLM 165, and the third controller 211 for controlling the SLM 140, which are coupled to the processor 193 that coordinates between the controllers 190. The controllers 190 can also include a fourth controller 512 for controlling the color wheel 505. The apparatus 500 further includes one or more sets of projection optics 518 and a reflector surface 519 that are configured to project and collimate beams of blue light 160 from the respective blue lasers 150 to the PLM 165.

The apparatus 500 also includes focusing optics 520 that are optically coupled to the PLM 165 and the phosphor 155. The focusing optics 520 project the beams of blue light 160 reflected from the micromirrors 215 of the PLM 165 onto the phosphor 155. The beams of blue light 160 excite respective illuminated areas of the phosphor 155 to emit the phosphor light 175. The phosphor 155 can be transmissive white phosphor configured to transmit blue, green, and red color modes in the phosphor 155 if excited by the blue light 160. The phosphor 155 provides a transmissive surface to the blue light 160 by emitting the blue color mode light 170, which is excited by the blue light 160, from the phosphor 155 to the color wheel 505. The blue color mode light 170 and the phosphor light 175, including the green, and red color modes, are projected onto an image plane 529 at the focus point of the focusing optics 520. The focus point and the image plane 529 can be located at the color wheel 505. The color wheel 505 is rotated, by one of the controllers 190 (e.g., the fourth controller 512), to switch between optical filters in the color wheel 505 and transmit respective color modes (e.g., blue, green, and red) in the phosphor light 175. The color modes are transmitted within the HVS rate for image integration by spinning the color wheel 505 at a certain speed.

The apparatus 500 further includes illumination optics 530 with one or more lenses between the image plane 529 and the SLM 140. The focusing optics 520 are configured to focus the blue light 160 from first illumination zones on the PLM 165 onto respective second illumination zones in the image plane between the phosphor 155 and the illumination optics 530. The illumination optics 530 are configured to image the respective second illumination zones in the image plane 529 to a background image on the SLM 140. The illumination optics 530 project the color modes of the phosphor light 175 from the image plane 529 onto the surface of the SLM 140. The illumination optics 530 can include a first lens 531 and a second lens 532 that project an illumination light beam 535, for each color mode, from the image plane 529 to the SLM 140. The apparatus 500 further includes a first prism 537 and a second prism 539 positioned between the illumination optics 530 and the SLM 140 to direct the illumination light beam 535 from the illumination optics 530 onto the SLM 140. The first prism 537 and second prism 539 also transmit the modulated light 120 from the SLM 140 to the projection optics 540.

The color modes of the phosphor light 175 can be projected on the color wheel 505 by the phosphor 155, which is transmissive phosphor, without a reflective optical path and a dichroic mirror between the focusing optics 520 and the phosphor 155, and without a diffuser or further optics to image the light onto and from a dichroic mirror. Accordingly, thermal control in the apparatus 500 can be increased with fewer heated components (e.g., the phosphor 155) in comparison to other configurations that include more heated components, such as the phosphor wheel 408 in the apparatus 400 or the diffuser 227 in the apparatus 200.

In examples, the color modes can be simultaneously projected on different areas of the SLM 140, and accordingly on different pixels in the projected image, and scrolled over time on the surface of the SLM 140 to illuminate each pixel in the image with each color mode. If the color modes are scrolled at a certain speed to project images within the HVS rate for image integration, the HVS can perceive the images as a single image in full color. Simultaneously projecting and scrolling the color modes on the surface of the SLM can increase the power and light efficiency in the display device 110 in comparison to transmitting each color mode at a time by a respective optical filter (e.g., with a color wheel). Increasing the light efficiency also increases brightness and contrast in the image.

In examples, the color modes from a blue laser and a phosphor can be selected and transmitted and then scrolled on the surface of an SLM by different devices. Examples of light scrolling devices that can be useful for scrolling the color modes simultaneously on the surface of the SLM include patterned color wheels with wedges or gratings, MEMS mirrors, voice coil actuators, Risley prisms, galvanometer optical scanners, multi-die packages, Bragg gratings, Kerr cells, scrolling PLMs, or other light scrolling apparatuses. For example, a patterned color wheel can be configured to rotate and split the blue, green, and red color modes from blue laser and a phosphor light, and image the separate color modes simultaneously on an SLM.

In other examples, the phosphor is positioned on a path that redirects the blue light 160 by multiple reflective surfaces (e.g., mirrors, dichroic mirrors) between the PLM 165 and the SLM 140, also referred to herein as a blue wrap path. The phosphor can be positioned at a fixed location or on a phosphor wheel. The phosphor wheel can also include a transmissive surface portion, such as glass, optical plastic, or an opening in the wheel, that is configured to transmit the blue light 160. The transmissive surface is configured to transmit at a least a portion of the blue light 160 from the PLM 165 to the SLM 140. The blue wrap path can also include one or more diffusers to diffuse the blue light 160 and/or the blue color mode light 170.

Figure 6:
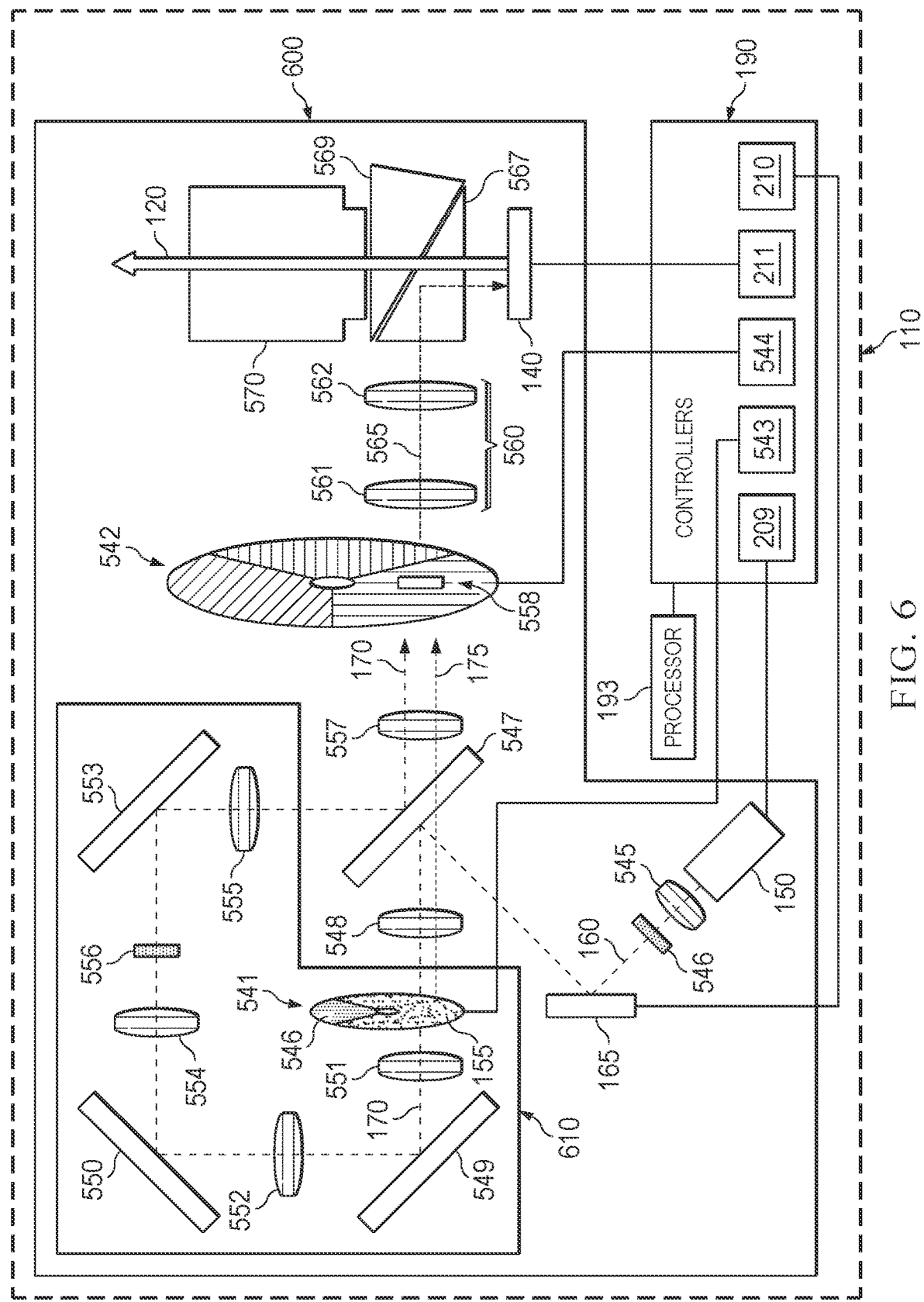
FIG. 6 is a diagram of an apparatus of a display device of the display system of FIG. 1, in accordance with various examples.

FIG. 6 is a diagram of an apparatus 600 of the display device 110 that includes a blue wrap path 610, in accordance with various examples. For example, the apparatus 600 is an example of the apparatus 180 of the optically coupled components in the display device 110. The display device 110 also includes the one or more controllers 190 which are coupled to the apparatus 600. The apparatus 600 includes the SLM 140, one or more blue lasers 150, the PLM 165, the phosphor 155 on a phosphor wheel 541, and a color wheel 542, which are coupled to the one or more controllers 190. The controllers 190 can include the first controller 209 for controlling the blue lasers 150, the second controller 210 for controlling the PLM 165, and the third controller 211 for controlling the SLM 140, which are coupled to the processor 193 that coordinates between the controllers 190. The controllers 190 can also include a fourth controller 543 for controlling the phosphor wheel 541, and a fifth controller 544 for controlling the color wheel 542.

The apparatus 600 can also include a set of projection optics 545 that are configured to project and collimate a beam of blue light 160 from each blue laser 150 to the PLM 165. The example of FIG. 6 shows a beam of blue light 160 from a blue laser 150 with a respective set of projection optics 545. The apparatus 600 also includes a first diffuser 546 optically coupled to the projection optics 545 and the PLM 165. The first diffuser 546 is configured to diffuse and shape the spot of the beam of blue light 160 from the blue laser 150 onto the PLM 165. The PLM 165 modulates and reflects the blue light 160 towards a dichroic mirror 547 in the apparatus 600, which is configured to reflect the blue light 160 to the phosphor wheel 541. The apparatus 600 can also include first focusing optics 548 positioned between the dichroic mirror 547 and the phosphor wheel 541.

The phosphor wheel 541 can be part of the blue wrap path 610 which includes optical components that redirect the blue light 160 on a path that is wrapped between the PLM 165 and the SLM 140. The phosphor wheel 541 includes the phosphor 155 and a transmissive surface portion 546, such as glass, optical plastic, or an opening. The phosphor 155 can be a reflective phosphor that is excited by a first portion of the blue light 160 to emit the phosphor light 175 in the opposite direction to the received blue light 160. For example, the phosphor light 175 can be yellow light or white light. The phosphor light 175 is emitted from the phosphor 155 to the dichroic mirror 547 through the first focusing optics 548. The dichroic mirror 547 is configured to transmit in turn the phosphor light 175 to the color wheel 542. The transmissive surface portion 546 of the phosphor wheel 541 transmits a second portion of the blue light 160 as a blue color mode light 170 to a first reflector surface 549 in the blue wrap path 610.

The first reflector surface 549 redirects by reflection the blue color mode light 170 in the blue wrap path 610 to a second reflector surface 550. The blue wrap path 610 can also include second focusing optics 551 positioned between the phosphor wheel 541 and the first reflector surface 549, and third focusing optics 552 positioned between the first reflector surface 549 and the second reflector surface 550. The second reflector surface 550 also redirects by reflection the blue color mode light 170 in the blue wrap path 610 to a third reflector surface 553, which in turn reflects the blue color mode light 170 to the dichroic mirror 547 and completes a wrapped around path for the blue color mode light 170. The blue wrap path 610 can also include fourth focusing optics 554 positioned between the second reflector surface 550 and the third reflector surface 553, and fifth focusing optics 555 positioned between the third reflector surface 553 and the dichroic mirror 547. As shown in FIG. 6, the blue wrap path 610 can also include a second diffuser 556 positioned between the fourth focusing optics 554, or the second reflector surface 550, and the third reflector surface 553. In other examples, the second diffuser 556 can be positioned on any of the path segments in the blue wrap path 610.

The apparatus 600 also includes sixth focusing optics 557 positioned between the dichroic mirror 547 and the color wheel 542. The six focusing optics 557, with the first focusing optics 548 and the other focusing optics in the blue wrap path 610, are configured to project the blue color mode light 170 and the phosphor light 175 onto an image plane 558 at the focus point of the sixth focusing optics 557. The focus point and the image plane 558 can be located at the color wheel 542. The color wheel 542 is rotated, by one of the controllers 190 (e.g., the fifth controller 544), to switch between optical filters in the color wheel 542 and transmit respective color modes (e.g., blue, green, and red) in the phosphor light 175 and the blue color mode light 170. The color modes can be transmitted within the HVS rate for image integration by spinning the color wheel 542 at a certain speed.

The apparatus 600 further includes illumination optics 560 with one or more lenses between the image plane 558 and the SLM 140. The illumination optics 560 are configured to image the illumination zones in the image plane 558 to a background image on the SLM 140. The illumination optics 560 project the color modes of the phosphor light 175 and the blue color mode light 170 from the image plane 558 onto the surface of the SLM 140. The illumination optics 560 can include a first lens 561 and a second lens 562 that project an illumination light beam 565, for each color mode, from the image plane 558 to the SLM 140. The apparatus 600 further includes a first prism 567 and a second prism 569 positioned between the illumination optics 558 and the SLM 140 to direct the illumination light beam 565 from the illumination optics 560 onto the SLM 140. The first prism 567 and second prism 569 also transmit the modulated light 120 from the SLM 140 to the projection optics 570.

In other examples, the blue laser light can be split without a color wheel by a phosphor having different color segments that produce respective color modes. For example, the segments can be in the form of stripes on the surface or across the phosphor. A color segment can be a different color phosphor from other segments. For example, adjacent green and red phosphor segments can be excited by a portion of the blue laser light to reflect green and red color modes, respectively. The reflective green and red phosphor segments can also be adjacent to a mirror or a diffuser that reflects a second portion of the blue laser light to provide a blue light color mode. The different color modes can be scrolled on the SLM by a certain scrolling device.

Figure 7:
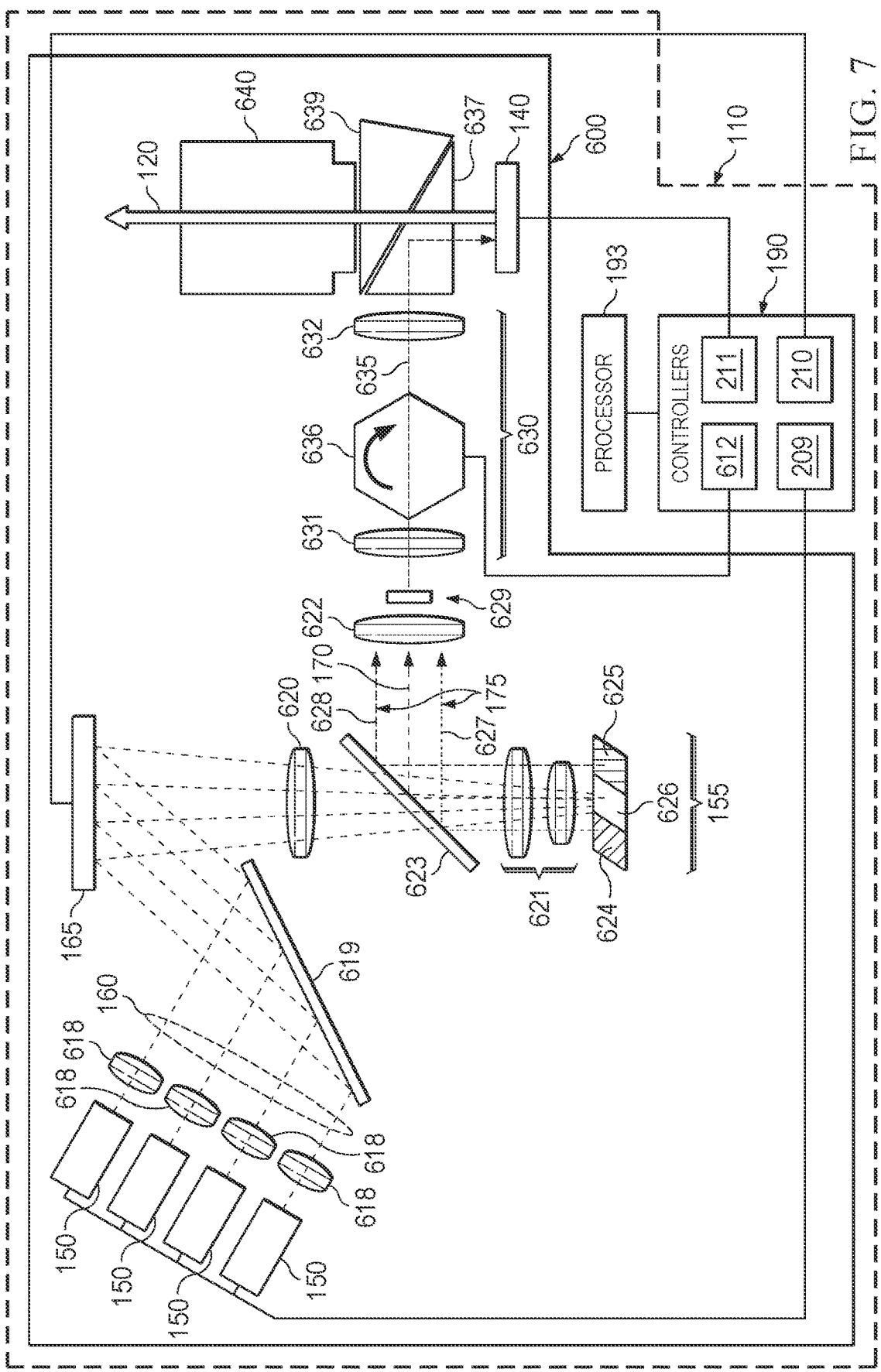
FIG. 7 is a diagram of an apparatus of a display device of the display system of FIG. 1, in accordance with various examples.

FIG. 7 is a diagram of an apparatus 600 of the display device 110 with a scrolling device for scrolling multiple color modes, in accordance with various examples. For example, the apparatus 600 is an example of the apparatus 180 of the optically coupled components in the display device 110. The display device 110 also includes the one or more controllers 190 which are coupled to the apparatus 600. The apparatus 600 includes the SLM 140, one or more blue lasers 150, the PLM 165, the phosphor 155, and a scrolling polygon 636, which are coupled to the one or more controllers 190. The components of the apparatus 600 are configured for scrolling and projecting color modes on the surface of the SLM 140 to display a full color image. In the apparatus 600, the phosphor 155 is configured as a reflective phosphor which allows for cooling the phosphor 155 directly, such as by directly coupling the back surface of the phosphor 155 to a heat sink. The controllers 190 include the first controller 209 of the blue lasers 150, the second controller 210 of the PLM 165, and the third controller 211 of the SLM 140, which are coupled the processor 193. The controllers 190 can also include a fourth controller 612 for controlling the scrolling polygon 636. The apparatus 600 further includes sets of projection optics 618 and a reflector surface 619 that are configured to project and collimate beams of blue light 160 from the respective blue lasers 150 to the PLM 165.

The apparatus 600 also includes focusing optics including first optics 620, second optics 621, third optics 622, and a polarized beam splitter 623, which are optically coupled to the PLM 165 and the phosphor 155. The polarized beam splitter 623 is configured to transmit light at a certain first polarization and reflect the light at a second polarization orthogonal to or different than the first polarization. The first optics 620 project beams of blue light 160 from the micromirrors 215 of the PLM 165 towards the polarized beam splitter 623. The blue light 160 can be polarized at the first polarization, such as by optical linear polarizers (not shown) at the one or more blue lasers 150, between the one or more blue lasers 150 and the PLM 165, or between the PLM 165 and the polarized beam splitter 623. The polarized beam splitter 623 then transmits each beam of blue light 160 to the second optics 621 at the same first polarization. In turn, the second optics 621 project the blue light 160 onto the phosphor 155. The first optics 620 and second optics 621 are configured to focus the beams of blue light 160 from the PLM 165 to illuminate respective areas on the surface of the phosphor 155. The beams of blue light 160 excite the respective illuminated areas of the phosphor 155 to reflect the phosphor light 175 including multiple color modes. The polarized beam splitter 623 reflects the color modes at the same second polarization from the phosphor 155 to the third optics 622.

The phosphor 155 in the apparatus 600 is partitioned into different phosphor color segments. For example, the phosphor 155 includes a reflective green phosphor segment 624 that emits a green color mode light 627 excited by a first portion or beams of blue light 160, and a reflective red phosphor segment 625 that emits a red color mode light 628 excited by a second portion or beams of blue light 160. The first polarization of the blue light 160 is rotated by 90 degrees to the second polarization of the green color mode light 627 and red color mode light 628 in the phosphor light 175 from the phosphor 155. The phosphor 155 also includes a reflective surface (e.g., a mirror) segment 626 that reflects a third portion or beams of blue light 160 as the blue color mode light 170. The reflective surface segment 626 can also be a diffuser configured to diffuse the blue light 160. The reflective surface segment 626 may be positioned between the reflective green phosphor segment 624 and the reflective red phosphor segment 625, as shown in FIG. 7. In other examples, the reflective surface segment 626, the reflective green phosphor segment 624, and the reflective red phosphor segment 625 can be arranged in different orders in the phosphor 155. The first polarization of the blue light 160 is also rotated to the second polarization of the blue color mode light 170. Accordingly, the blue color mode light 170 and the phosphor light 175, including the green color mode light 627 and red color mode light 628, are reflected by the polarized beam splitter 623 to the third optics 622. The third optics 622 focuses the blue color mode light 170 and the phosphor light 175 to an image plane 629 at the focus point of the third optics 622. Accordingly, a background image for the hologram of the PLM 165 is formed on the image plane 629.

The apparatus 600 also includes illumination optics 630 with one or more lenses between the image plane 629 and the SLMs 140. The illumination optics 630 project, from the image plane 629 onto the SLMs 140, an illumination light beam 635 which includes the blue color mode light 170 with the green color mode light 627 and red color mode light 628 of the phosphor light 175. The illumination optics 630 can include a first lens 631 and a second lens 632 that image the background image from the image plane 629 onto the surfaces of the SLM 140. A scrolling polygon 636 is positioned between the first lens 631 and a second lens 632. In other examples, the scrolling polygon 636 can be positioned at other locations on the optical path between the third optics 622 and the first prism 637. The scrolling polygon 636 can be a hexagon shape prism made of a dielectric material, such as glass. The scrolling polygon 636 is configured to rotate in the direction along the optical path of the illumination optics 630. The scrolling polygon 636 can be rotated in the clockwise direction, as shown in FIG. 7, or in the counter-clockwise direction. The rotation of the scrolling polygon 636 is controlled by one of the controllers 190 (e.g., the fourth controller 612).

The scrolling polygon 636 is rotated to scroll the blue color mode light 170, green color mode light 627, and red color mode light 628, which are simultaneously transmitted in the illumination light beam 635, on the surface of the SLM 140. Spinning the scrolling polygon 636 changes the angles of refractions of the respective color modes in the scrolling polygon 636, and accordingly moves the illumination zones of the respective color modes on the surface of the SLM 140, which is referred to herein as scrolling. The illumination zones of the different color modes, which are emitted from the respective reflective phosphor color segments of the phosphor 155, appear as respective color segments on the surface of the SLM 140 and accordingly in the projected image. Spinning the scrolling polygon 636 to scroll the color segments on the surface of the SLM 140 also causes the scrolling of color segments in respective projected images. The scrolling polygon 636 is rotated at a certain speed to project images with color segments within the HVS rate for image integration. This allows the HVS to perceive the projected images with moving color segments as a single image in full color.

In other examples, the color modes in the illumination light beam 635 can be scrolled by a different device or component than the scrolling polygon 636. For example, the color modes can be scrolled onto the SLM 140 by a patterned color wheel, MEMS mirrors, or other light scrolling devices or components. The apparatus 600 further includes a first prism 637 and a second prism 639 positioned between the illumination optics 630 and the SLM 140 to direct the illumination light beam 635 from the illumination optics 630 onto the SLM 140. The first prism 637 and second prism 639 also transmit the modulated light 120 from the SLM 140 to the projection optics 640.

In examples, the blue light 160, blue color mode light 170, and phosphor light 175 can be directed in the display device 110 by a transmissive phosphor configuration with fewer optics and optical paths than in the apparatus 600. For example, reducing the number of components and/or optical paths in the display device 110, such as removing the polarized beam splitter 623 and the associated reflective optical path, can reduce size and cost of the display device 110.

Figure 8:
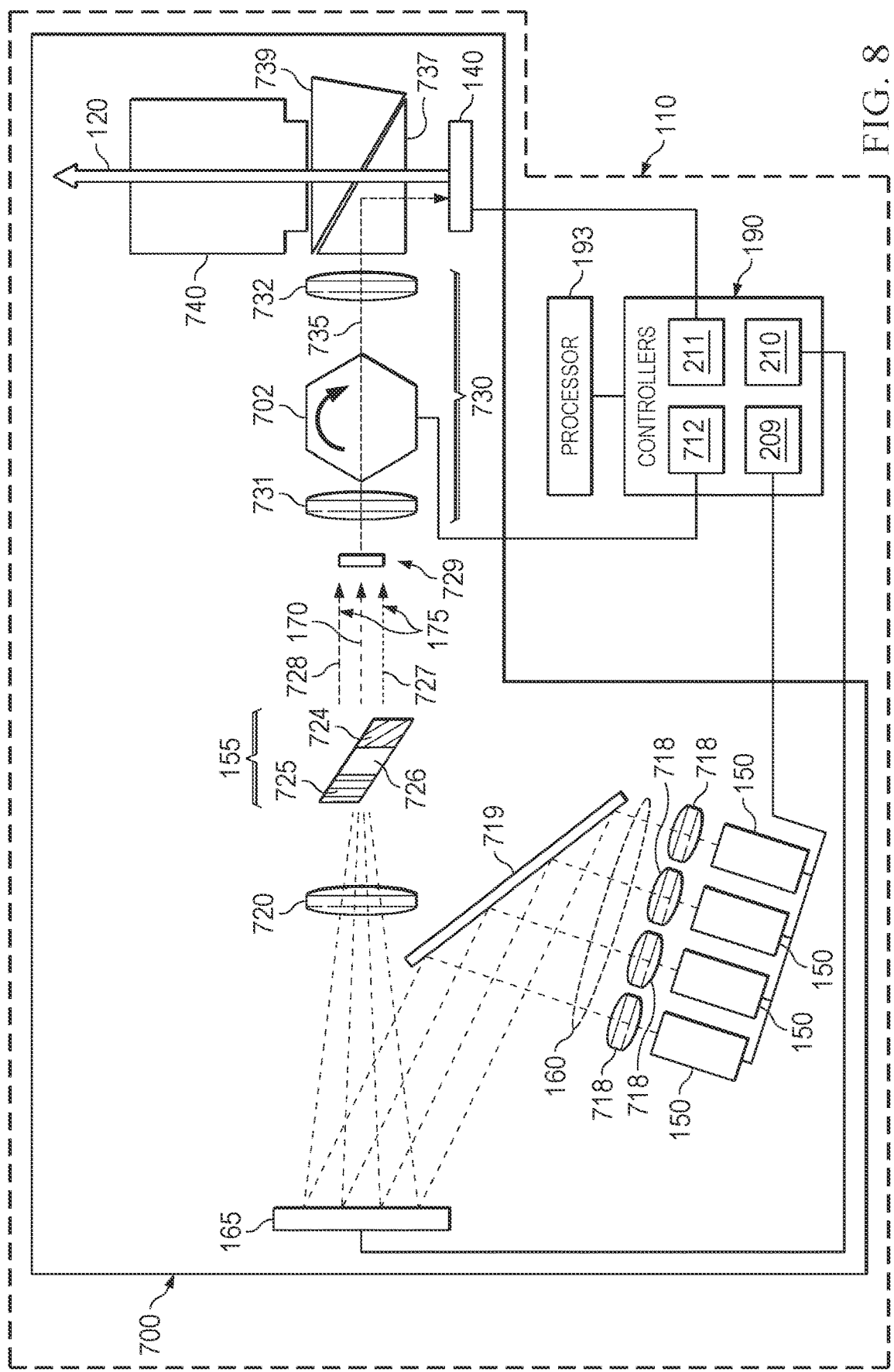
FIG. 8 is a diagram of an apparatus of a display device of the display system of FIG. 1, in accordance with various examples.

FIG. 8 is a diagram of an apparatus 700 of the display device 110 with a transmissive phosphor configuration, in accordance with various examples. For example, the apparatus 700 is an example of the apparatus 180 of the optically coupled components in the display device 110. The display device 110 also includes the one or more controllers 190 which are coupled to the apparatus 700. The apparatus 700 includes the SLM 140, one or more blue lasers 150, the PLM 165, the phosphor 155, and a scrolling polygon 702, which are coupled to the one or more controllers 190. The controllers 190 can include the first controller 209 for controlling the blue lasers 150, the second controller 210 for controlling the PLM 165, the third controller 211 for controlling the SLM 140, and the processor 193 that coordinates between the controllers 190. The controllers 190 can also include a fourth controller 712 for controlling the scrolling polygon 702. The apparatus 700 further includes one or more sets of projection optics 718 and a reflector surface 719 that are configured to project and collimate beams of blue light 160 from the respective blue lasers 150 to the PLM 165.

The apparatus 700 also includes focusing optics 720 that are optically coupled to the PLM 165 and the phosphor 155. The focusing optics 720 project the beams of blue light 160 reflected from the micromirrors 215 of the PLM 165 onto the phosphor 155. The beams of blue light 160 excite respective illuminated areas of the phosphor 155 to emit the phosphor light 175. The phosphor 155 is partitioned into transmissive phosphor color segments. For example, the phosphor 155 includes a transmissive green phosphor segment 724 that transmits a green color mode light 727 excited by a first portion or beams of blue light 160, and a transmissive red phosphor color segment 725 that transmits a red color mode light 728 excited by a second portion or beams of blue light 160. The green color mode light 727 and red color mode light 728 form the phosphor light 175 from the phosphor 155. The phosphor 155 also includes a transmissive surface (e.g., glass) segment 726 that transmits a third portion or beams of blue light 160 as the blue color mode light 170. The transmissive surface segment 726 may be positioned in any position with respect to the transmissive green phosphor segment 724 and the transmissive red phosphor color segment 725. FIG. 8 shows an example where the transmissive surface segment 726 is positioned between the transmissive green phosphor segment 724 and the transmissive red phosphor color segment 725. The blue color mode light 170 with the green color mode light 727 and red color mode light 728 of the phosphor light 175 are focused by the focusing optics 720 to an image plane 729 at the focus point of the focusing optics 720. Accordingly, a background image for the hologram of the PLM 165 is formed on the image plane 729.

The apparatus 700 also includes illumination optics 730 with one or more lenses between the image plane 729 and the SLMs 140. The illumination optics 730 project, from the image plane 729 onto the SLMs 140, an illumination light beam 735 which includes the blue color mode light 170 with the green color mode light 727 and red color mode light 728 in the phosphor light 175. The illumination optics 730 can include a first lens 731 and a second lens 732 that image the background image from the image plane 729 onto the surfaces of the SLM 140. As shown in FIG. 7, the first lens 731 and a second lens 732 can be positioned on opposite sides of the scrolling polygon 702, which is rotated by one of the controllers 190 (e.g., the fourth controller 712) to scroll the blue color mode light 170, green color mode light 727, and red color mode light 728 on the surface of the SLM 140.

In other examples, the color modes in the illumination light beam 735 can be scrolled by a different device or component than the scrolling polygon 702, such as by rotating mirrors, prisms, or a square shape prism. The apparatus 700 further includes a first prism 737 and a second prism 739 positioned between the illumination optics 730 and the SLM 140 to direct the illumination light beam 735 from the illumination optics 730 onto the SLM 140. The first prism 737 and second prism 739 also transmit the modulated light 120 from the SLM 140 to the projection optics 740.

Figure 9:
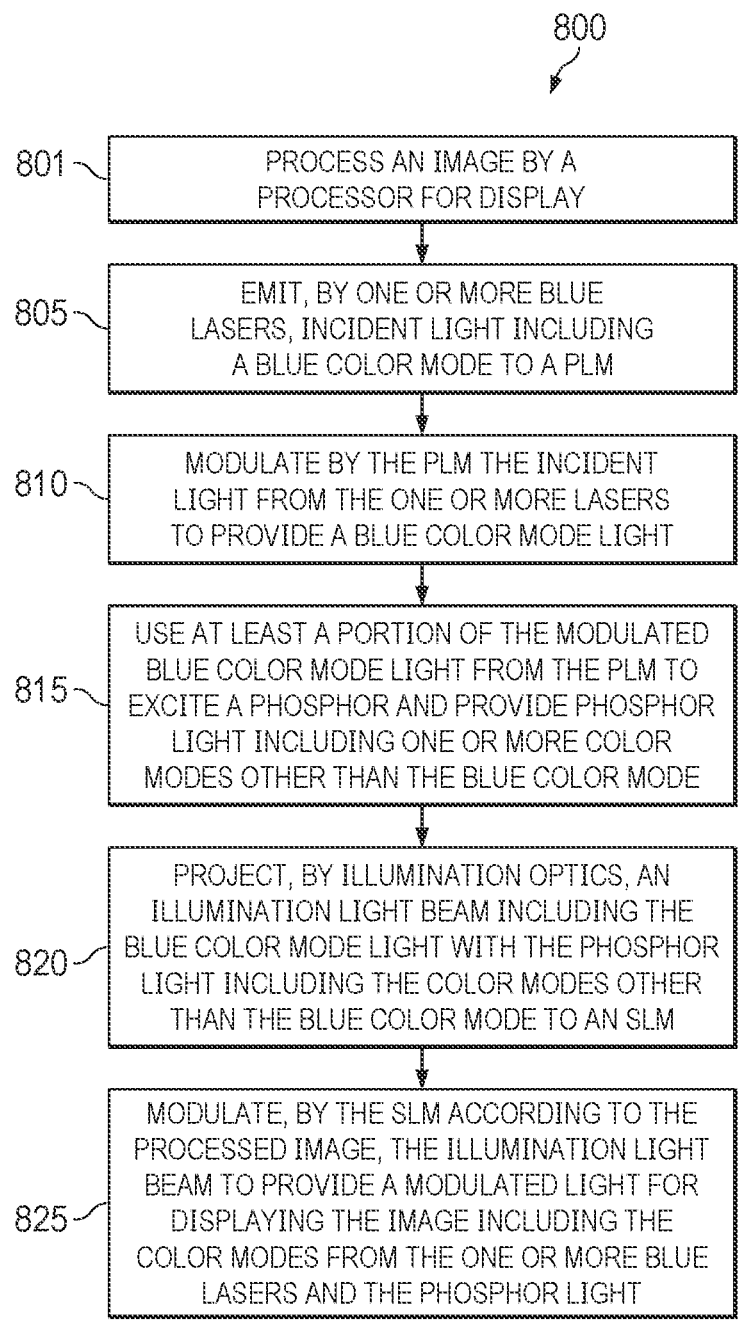
FIG. 9 is a flow diagram of a method for HDR modulation with laser light and phosphor light, in accordance with various examples.

FIG. 9 is a flow diagram of a method 800 for HDR modulation with laser light and phosphor light, in accordance with various examples. The laser light is modulated by a PLM to produce phosphor light and provide backlight to the SLM with multiple color modes. The backlight is modulated by an SLM to project an image in full color. For example, the steps of the method 800 can be implemented by the display device 110 with one of the apparatuses 200 to 700. The method 800 is implemented to project and display images in a projection-based display system, such as the display system 100. At step 801, an image is processed to produce a processed image for display. For example, the image can be a digital image processed by the processor 193 to provide a processed image. The processed image can be converted into control data and signals for controlling the one or more blue lasers 150, the PLM 165, and the SLM 140 to modulate light for projecting the image. At step 805, incident light including a blue color mode is emitted by one or more blue lasers to a PLM. For example, the one or more blue lasers 150 transmit respective beams of blue light 160 to the PLM 165. The beams of blue light 160 can be collimated by respective lenses between the blue lasers 150 and the PLM 165 to determine equal respective illumination zones on the PLM 165.

At step 810, the incident light from the one or more blue lasers is modulated by the PLM according to the processed image to provide a blue color mode light. For example, the micromirrors 215 of the PLM 165 can be adjusted by the controllers 190 according to the control data and signals to provide a hologram for projecting a background image by the PLM 165. At step 815, at least a portion of the blue color mode light is used from the PLM to excite a phosphor and provide phosphor light including one or more color modes other than the blue color mode light. For example, the PLM 165 can project beams of blue light 160 to a phosphor 155, which is reflective phosphor, to excite the phosphor 155 to emit green and red color modes. The phosphor 155 can be reflective yellow or white phosphor such as in the apparatus 200, 300, or 400, or can be segmented into reflective green and red phosphor segments such as in the apparatus 600. The phosphor 155 can also include a reflective segment (e.g., a mirror) for reflecting the blue light 160, such as the reflective surface segment 626 of the apparatus 600. In other examples, the PLM 165 can project beams of blue light 160 to a phosphor 155, which is transmissive phosphor, to excite the phosphor 155 to emit green and red color modes. The phosphor 155 can be transmissive yellow or white phosphor such as in the apparatus 500, or can be segmented into transmissive green and red phosphor segments such as in the apparatus 700. The phosphor 155 can also include a transmissive segment (e.g., glass) for transmitting the blue light 160, such as the transmissive surface segment 726 of the apparatus 700.

At step 820, an illumination light beam, including the blue color mode light with the phosphor light including the color modes other than the blue color mode, is projected, by illumination optics, to an SLM. The illumination light beam is projected to project and image a background image of the PLM onto the SLM according to an HDR modulation. The illumination light beam can be projected from an image plane between the phosphor and the SLM. For example, the illumination optics 230, 430, or 530 project and image each color mode (e.g., blue, green, and red) at a time in a respective illumination light beam from the phosphor 155 to the SLM 140. In other examples, the illumination optics 330, 630, or 730 project and image the color modes simultaneously in the illumination light beam from the phosphor 155 to the SLM 140. At step 825, the illumination light beam is modulated by the SLM according to the processed image to provide a modulated light for displaying the image including the color modes from the one or more lasers and the phosphor light. For example, the SLM 140 can be controlled by the controllers 190 according to the control data and signals from the processor 193 to modulate the illumination light beam including each color mode to provide the modulated light 120. The illumination light beam can include each color mode at a time which can be transmitted in sequence in time by the color wheel 205 (or 405-505), or all the color modes that are transmitted simultaneously in the illumination light beam 335 (or 635-735). The SLM 140 can be a DMD with micromirrors that are tilted by the controllers 190 according to on-state and off-state which determines the light intensity in the modulated light 120 and accordingly the pixels of the projected image. In other examples, the SLM 140 can be an FLCoS, LCoS, or LCD with liquid crystals that are oriented by voltages driven by the controllers 190 to determine the light intensity in the modulated light 120.

According to the method 800, a modulated light is projected for displaying an image with a single color mode laser (e.g., blue laser) and a phosphor, which reduces the number of needed lasers and accordingly the cost and challenges associated with multiple color mode lasers. The phosphor is excited by the single color mode light (e.g., blue light) to emit the other color modes needed for displaying a full color image. For example, a yellow phosphor can be used to provide the green and red color modes with the blue color mode from a blue laser. A white phosphor can also be used to provide blue, green, and red color modes. The white phosphor can be excited by blue laser light or by any other light source with coherent light that can be modulated by a PLM. The method modulates the blue light or light modulated by the PLM and steers the modulated light onto the phosphor which is then imaged onto the SLM with multiple color modes. The modulated light can be coherent light such as laser light or incoherent light such as LED light. A light with higher coherence provides a higher quality image projection. For example, super-luminescent LEDs produce higher coherent light than LEDs and can provide higher quality image projection than LEDs. Accordingly, a PLM background image light can be provided to illuminate the SLM in multiple color modes with a single color mode laser. The background image light with multiple color modes is modulated by the PLM to project a modulated light with the color modes to display a full color image.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described structure, device, or apparatus. For example, an apparatus described as including one or more devices (such as PLMs, FLCs or light sources), one or more optical elements (such as lenses), and/or one or more electronic components (such as controllers, processors, or memories) may instead have at least some of the components integrated into a single component which is adapted to be coupled to the remaining components either at a time of manufacture or after a time of manufacture, for example, by an end-user and/or a third-party.

While certain components may be described herein as being of a particular process technology, these components may be exchanged for components of other process technologies. Devices described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. An apparatus, comprising:
one or more light sources capable of producing incident light having a first color;
a phase light modulator (PLM) optically coupled to the one or more light sources, wherein the PLM is capable of modulating the incident light to produce first modulated light;
a phosphor optically coupled to the PLM, wherein the phosphor is capable of receiving at least a first portion of the first modulated light from the PLM and emitting a phosphor light having a second color and a third color, the second color different than the first color and the third color different than the first color and the second color;
at least one spatial light modulator (SLM) optically coupled to the phosphor, wherein the at least one SLM is capable of modulating the phosphor light having the second color and the third color and at least a second portion of the first modulated light having the first color, to produce second modulated light; and
a first surface optically coupled to the PLM and to the at least one SLM, wherein the first surface is a reflective surface configured to reflect the second portion of the first modulated light from the PLM towards the at least one SLM or a transmissive surface configured to transmit the second portion of the first modulated light from the PLM towards the at least one SLM.

2. The apparatus of claim 1, wherein the one or more light sources are blue lasers.

3. The apparatus of claim 1, further comprising illumination optics optically coupled to the phosphor and the at least one SLM, wherein the illumination optics are capable of directing the phosphor light and the second portion of the first modulated light towards the at least one SLM.

4. The apparatus of claim 3, further comprising:
a dichroic mirror optically coupled to the PLM, the phosphor, and the illumination optics, wherein the dichroic mirror is capable of:
transmitting the first portion of the first modulated light from the PLM to the phosphor;
reflecting the phosphor light from the phosphor towards the illumination optics; and
reflecting the second portion of the first modulated light towards the first surface; and
a diffuser optically coupled to the dichroic mirror, wherein the first surface is a surface of the diffuser that is capable of diffusing and reflecting the second portion of the first modulated light through the dichroic mirror to the illumination optics.

5. The apparatus of claim 4, further comprising:
first focusing optics optically coupled to the PLM and the dichroic mirror, wherein the first focusing optics are capable of focusing the first modulated light from first illumination zones of the PLM onto respective second illumination zones on the phosphor;
second focusing optics optically coupled to the dichroic mirror and the phosphor, wherein the second focusing optics are capable of focusing the first portion of the first modulated light from the dichroic mirror onto the second illumination zones on the phosphor;
third focusing optics optically coupled to the diffuser and the dichroic mirror, wherein the third focusing optics are capable of focusing the second portion of the first modulated light from the dichroic mirror onto third illumination zones on the diffuser; and
fourth focusing optics optically coupled to the dichroic mirror, wherein the fourth focusing optics are capable of:
imaging, with the second focusing optics, the second illumination zones on the phosphor to respective illumination zones in an image plane between the phosphor and the illumination optics; and
imaging, with the third focusing optics, the third illumination zones on the diffuser to the respective illumination zones in the image plane,
wherein the illumination optics are capable of imaging the respective illumination zones in the image plane to a background image on the at least one SLM.

6. The apparatus of claim 3, further comprising a color wheel optically coupled to the phosphor and the illumination optics, wherein the color wheel includes multiple optical filters each capable of transmitting the second color and the third color of the phosphor light and the second portion of the first modulated light to the SLM.

7. The apparatus of claim 3, further comprising:
a phosphor wheel optically coupled to the PLM, wherein the phosphor wheel is a reflective phosphor wheel that includes the phosphor in a first segment and the first surface in a second segment, and wherein the phosphor wheel is capable of reflecting the phosphor light by the first segment and the second portion of the first modulated light by the second segment; and
a partial dichroic mirror or an offset mirror optically coupled to the PLM, the phosphor wheel, and the illumination optics, wherein the partial dichroic mirror or the offset mirror is capable of:
transmitting the first portion of the first modulated light from the PLM to the phosphor wheel; and
reflecting the phosphor light and the second portion of the first modulated light from the phosphor wheel to the illumination optics.

8. The apparatus of claim 3, wherein the first surface is a transmissive surface of the phosphor that is capable of transmitting the second portion of the first modulated light from the PLM to the illumination optics, wherein the apparatus further comprises focusing optics optically coupled to the PLM and the phosphor, wherein the focusing optics are capable of focusing the first modulated light from first illumination zones on the PLM onto respective second illumination zones in an image plane between the phosphor and the illumination optics, and wherein the illumination optics are capable of imaging the respective second illumination zones in the image plane to a background image on the at least one SLM.

9. The apparatus of claim 3, wherein the phosphor includes a reflective green phosphor segment, a reflective red phosphor segment, and a reflective surface segment, and wherein the apparatus further comprising:
a polarized beam splitter optically coupled to the PLM, the phosphor, and the illumination optics, wherein the polarized beam splitter is capable of:
transmitting, from the PLM to the phosphor, the first portion of the first modulated light at a first polarization; and
reflecting, from the phosphor at a second to the illumination optics, the phosphor light and the second portion of the first modulated light at a second polarization different than the first polarization;
first focusing optics optically coupled to the PLM and the polarized beam splitter, wherein the first focusing optics are capable of focusing the first modulated light from first illumination zones on the PLM towards respective second illumination zones on the phosphor;
second focusing optics optically coupled to the polarized beam splitter, wherein the second focusing optics are capable of imaging the second illumination zones on the phosphor to respective zones in an image plane between the phosphor and the illumination optics, wherein the illumination optics are capable of imaging the respective zones in the image plane to a background image on the at least one SLM; and
a scrolling polygon optically coupled to the illumination optics and the at least one SLM, wherein the scrolling polygon is capable of scrolling, by rotation, the phosphor light and the second portion of the first modulated light onto the at least one SLM.

10. The apparatus of claim 3, wherein the phosphor includes a transmissive green phosphor segment, a transmissive red phosphor segment, and a transmissive surface segment, the apparatus further comprising:
focusing optics optically coupled to the PLM and the phosphor, wherein the focusing optics are capable of focusing the first modulated light from first illumination zones on the PLM towards respective second illumination zones in an image plane between the phosphor and the illumination optics, and wherein the illumination optics are capable of imaging the second illumination zones in the image plane to a background image on the at least one SLM; and
a scrolling polygon optically coupled to the illumination optics and the at least one SLM, wherein the scrolling polygon is capable of scrolling, by rotation, the phosphor light and the second portion of the first modulated light onto the at least one SLM.

11. The apparatus of claim 1, further comprising an optical homogenizer optically coupled to the one or more light sources and the PLM, wherein the optical homogenizer is capable of collimating the incident light into a single collimated beam that provides uniform illumination on the PLM.

12. A device, comprising:
a processor capable of processing an image to produce a processed image;
one or more light sources capable of producing illumination light having a first color;
a phase light modulator (PLM) optically coupled to the one or more light sources, wherein the PLM is capable of modulating the illumination light to produce first modulated light having the first color;
a phosphor optically coupled to the PLM, wherein the phosphor is capable of receiving at least a first portion of the first modulated light from the PLM to and emitting phosphor light having a second color and a third color;
at least one spatial light modulator (SLM) optically coupled to the phosphor, wherein the at least one SLM is capable of modulating the phosphor light and at least a second portion of the first modulated light to produce second modulated light; and
one or more controllers coupled to the processor, the one or more light sources, the PLM, and the at least one SLM, wherein the one or more controllers are capable of controlling the one or more light sources, the PLM, and the at least one SLM responsive to the processed image.

13. The device of claim 12, wherein the phosphor is a transmissive phosphor optically coupled to the PLM and the at least one SLM, and wherein the transmissive phosphor is a yellow phosphor or a white phosphor.

14. The device of claim 12, wherein the phosphor is a reflective phosphor, and wherein the reflective phosphor is a yellow phosphor or a white phosphor.

15. The device of claim 12, wherein the phosphor comprises:
a transmissive or reflective green phosphor segment;
a transmissive or reflective red phosphor color segment; and
a transmissive or reflective surface segment capable of transmitting or reflecting, respectively, the second portion of the first modulated light.

16. The device of claim 12, further comprising a color wheel coupled to the one or more controllers and optically coupled to the PLM, wherein the color wheel includes multiple optical filters, and wherein the one or more controllers are capable of rotating the color wheel to switch between the multiple optical filters at a speed.

17. The device of claim 12, further comprising a phosphor wheel coupled to the one or more controllers and optically coupled to the PLM, wherein the phosphor wheel includes the phosphor, and wherein the phosphor wheel is a reflective phosphor wheel.

18. The device of claim 12, further comprising a scrolling device coupled to the one or more controllers and optically coupled to the SLM, wherein the scrolling device is or includes a patterned color wheel with wedges or gratings, MEMS mirrors, a voice coil actuator, a Risley prism, a galvanometer optical scanner, a multi-die package, a Bragg grating, a Kerr cell, or a scrolling PLM.

19. A method comprising:
producing, by one or more light sources, incident light having a first color;
modulating, by a phase light modulator (PLM), the incident light to provide first modulated light having the first color;
reflecting a first portion of the first modulated light, and transmitting a second portion of the first modulated light toward a phosphor;
producing, by the phosphor, responsive to at least the first portion of the first modulated light, phosphor light having a second color different than the first color;
directing, by illumination optics, the phosphor light and at least the second portion of the first modulated light towards a spatial light modulator (SLM); and modulating, by the SLM, the phosphor light having the second color and the at least the second portion of the first modulated light having the first color to provide second modulated light.

20. The method of claim 19, wherein the incident light is modulated according to a High Dynamic Range (HDR) modulation.

\* \* \* \* \*